US011903900B2

(12) United States Patent
Jones et al.

(10) Patent No.: US 11,903,900 B2
(45) Date of Patent: Feb. 20, 2024

(54) PACKAGING FOR MULTIPLE CONTAINERS

(71) Applicant: Takeda Pharmaceutical Company Limited, Osaka (JP)

(72) Inventors: Seth Dale Jones, Round Lake, IL (US); Madeleine Clare Gibson, Madison, WI (US); Denise A. Alexander, Naperville, IL (US); Daniel Edward Roush, Niles, IL (US)

(73) Assignee: Takeda Pharmaceutical Company Limited, Osaka (JP)

(*) Notice: Subject to any disclaimer, the term of this patent is extended or adjusted under 35 U.S.C. 154(b) by 372 days.

(21) Appl. No.: 17/282,132

(22) PCT Filed: Sep. 24, 2019

(86) PCT No.: PCT/US2019/052574

§ 371 (c)(1),
(2) Date: Apr. 1, 2021

(87) PCT Pub. No.: WO2020/072231

PCT Pub. Date: Apr. 9, 2020

(65) Prior Publication Data

US 2021/0369566 A1 Dec. 2, 2021

Related U.S. Application Data

(60) Provisional application No. 62/740,490, filed on Oct. 3, 2018.

(51) Int. Cl.
*A61J 1/20* (2006.01)
*A61J 1/16* (2023.01)
(Continued)

(52) U.S. Cl.
CPC ............... *A61J 1/16* (2013.01); *A61J 1/1412* (2013.01); *A61J 1/1493* (2013.01); *B65D 71/50* (2013.01)

(58) Field of Classification Search
CPC .... A61M 5/1413; A61J 1/1475; A61J 1/1462; A61J 1/1493; A61J 1/1412; A61J 1/2013;
(Continued)

(56) References Cited

U.S. PATENT DOCUMENTS

| | | | |
|---|---|---|---|
| 363,690 | A | 5/1887 | Sleeper |
| 2,080,947 | A | 5/1937 | Ligeour |

(Continued)

FOREIGN PATENT DOCUMENTS

| | | | |
|---|---|---|---|
| CN | 1668352 | A | 9/2005 |
| CN | 102387827 | A | 3/2012 |
| CN | 202184989 | U | 4/2012 |
| CN | 202236710 | U | 5/2012 |
| CN | 102711710 | A | 10/2012 |

(Continued)

OTHER PUBLICATIONS

International Search Report and Written Opinion dated Jul. 26, 2013 in connection with International Application No. PCT/US2013/0368769.

(Continued)

*Primary Examiner* — King M Chu
(74) *Attorney, Agent, or Firm* — Wolf, Greenfield & Sacks, P.C.

(57) ABSTRACT

A container unit may be used to facilitate administrations of multiple medicinal fluids to a patient. A container unit may include a first container, a second container, and a carrier which holds the first container and the second container stationary relative to each other. The carrier may include a lip configured to engage a pooling device to secure the container unit to the pooling device. The carrier may also include a slot configured to engage an insert on the pooling device to guide the container unit as the container unit is secured to the pooling device. The carrier may also include a first portion and second portion with different shapes that are complementary to a shape of a port on the pooling device. The carrier may also include an extension which
(Continued)

extends in a direction away from one of the first container to a level at least even with a stopper disposed in the first container. The container unit may include a lid including at least one rotation inhibitor configured to inhibit rotation of the lid about at least one axis. A plurality of container units may include container units having different volume containers while maintaining a congruent interface portions.

18 Claims, 21 Drawing Sheets

(51) Int. Cl.
*A61J 1/14* (2023.01)
*B65D 71/50* (2006.01)

(58) Field of Classification Search
CPC ...... A61J 1/2055; A61J 1/2089; A61J 1/2096; A61J 1/2003; B65D 71/50
USPC .......................................... 604/411; 206/570
See application file for complete search history.

(56) References Cited

U.S. PATENT DOCUMENTS 2,399,893 A 5/1946 Scholz
D159,762 S 8/1950 Touhey
2,754,962 A 7/1956 Scrymgeour
2,865,669 A 12/1958 Linthicum
2,949,204 A 8/1960 Edwards
3,278,007 A 10/1966 Weber
3,543,355 A 12/1970 Wyckoff et al.
3,589,509 A 6/1971 Mascia et al.
3,593,873 A 7/1971 Vonk
3,601,253 A 8/1971 Poupitch
3,727,749 A 4/1973 Martin
3,744,661 A 7/1973 Fischer, Jr.
3,876,377 A 4/1975 Cinqualbre
3,882,909 A 5/1975 Ogle
3,893,280 A 7/1975 King
4,143,764 A 3/1979 Moss, III
4,178,152 A 12/1979 Nunogaki
4,262,814 A 4/1981 Roccaforte
4,402,691 A 9/1983 Rosenthal et al.
4,405,315 A 9/1983 Handt
4,526,756 A 7/1985 Wong
D280,932 S 10/1985 Green
4,557,727 A 12/1985 Handt
D283,640 S 4/1986 Grimes
4,713,064 A 12/1987 Bruno et al.
4,759,756 A 7/1988 Forman et al.
4,795,429 A 1/1989 Feldstein
4,807,777 A 2/1989 Berwald et al.
4,850,972 A 7/1989 Schulman et al.
4,856,647 A 8/1989 Dahne
4,863,049 A 9/1989 Suzuki et al.
4,873,921 A 10/1989 Piane, Sr.
D306,645 S 3/1990 Parker
4,915,688 A 4/1990 Bischof et al.
4,915,689 A 4/1990 Theeuwes
4,970,053 A 11/1990 Fechtner
5,005,721 A 4/1991 Jordan
5,009,309 A 4/1991 Hansen
5,037,390 A 8/1991 Raines et al.
5,040,678 A 8/1991 Lenmark, Sr. et al.
5,061,264 A 10/1991 Scarrow
5,117,997 A 6/1992 Fink
5,148,919 A 9/1992 Rubin
5,304,165 A 4/1994 Haber et al.
5,322,668 A 6/1994 Tomasso
D355,260 S 2/1995 Tomasso
5,431,509 A 7/1995 Anderson et al.
5,465,841 A 11/1995 Wilson et al.
5,582,222 A 12/1996 Riall
5,609,248 A 3/1997 Rohrbough et al.
5,725,499 A 3/1998 Silverstein et al.
5,785,701 A 7/1998 Sams et al.
5,836,910 A 11/1998 Duffy et al.
5,873,731 A 2/1999 Prendergast
5,897,526 A 4/1999 Vaillancourt
5,941,846 A 8/1999 Duffy et al.
5,954,213 A 9/1999 Gerhart et al.
5,957,313 A 9/1999 Bouan
5,989,237 A 11/1999 Fowles et al.
6,000,548 A 12/1999 Tsals
6,102,232 A 8/2000 Lin et al.
6,102,233 A 8/2000 Waugh
6,164,450 A 12/2000 Benedetti
6,213,529 B1 4/2001 Kurcz et al.
6,305,541 B1 10/2001 Tanner et al.
D457,949 S 5/2002 Krug et al.
6,474,375 B2 11/2002 Spero et al.
6,508,791 B1 1/2003 Guerrero
6,558,628 B1 5/2003 Reo
6,613,283 B2 9/2003 Reo
6,641,565 B1 11/2003 Lavi et al.
6,789,828 B1 9/2004 Borg
6,929,474 B2 8/2005 Schenck et al.
7,074,205 B1 7/2006 Duffy et al.
7,214,210 B2 5/2007 Kamen et al.
7,442,181 B2 10/2008 Schubert et al.
7,468,049 B2 12/2008 Laveault
7,553,291 B2 6/2009 Duffy et al.
7,607,541 B2 10/2009 Girgis et al.
D620,603 S 7/2010 Talmer et al.
7,798,997 B2 9/2010 Kamen et al.
7,819,342 B2 10/2010 Spallek et al.
D632,802 S 2/2011 Salinas et al.
7,935,076 B2 5/2011 Estes et al.
D645,973 S 9/2011 Hoenes
8,425,487 B2 4/2013 Beiriger et al.
8,545,440 B2 10/2013 Patrick et al.
8,652,097 B2 2/2014 Lee
8,684,433 B2 4/2014 Oesterle et al.
8,790,328 B2 7/2014 Kragelund et al.
8,968,244 B2 3/2015 Kamen et al.
9,132,061 B2 9/2015 Beiriger
D769,456 S 10/2016 Dulaff
D778,460 S 2/2017 Marechal et al.
D847,634 S 5/2019 Hatakeyama
D847,974 S 5/2019 McNall et al.
D865,993 S 11/2019 Trump et al.
D886,611 S 6/2020 Jones et al.
D890,358 S 7/2020 Jones et al.
D893,046 S 8/2020 Jones et al.
D902,428 S 11/2020 Klintstedt et al.
11,684,548 B2 6/2023 Schweiss et al.
2001/0009994 A1 7/2001 Small et al.
2002/0004643 A1 1/2002 Carmel et al.
2002/0104584 A1 8/2002 Spero et al.
2003/0107628 A1 6/2003 Fowles et al.
2004/0241041 A1* 12/2004 Woodworth .......... A61J 1/1406 250/455.11
2004/0260266 A1 12/2004 Cuschieri et al.
2005/0045495 A1 3/2005 Dalsing et al.
2005/0126653 A1 6/2005 Tachikawa et al.
2005/0175338 A1 8/2005 Ide et al.
2007/0005020 A1 1/2007 Laveault
2007/0267378 A1 11/2007 Piccinino et al.
2007/0278245 A1 12/2007 Brooks et al.
2009/0062732 A1 3/2009 Radmer
2009/0099547 A1 4/2009 Radmer
2009/0182300 A1 7/2009 Radmer et al.
2010/0022974 A1* 1/2010 Sharratt .................. A61M 5/19 206/570
2012/0029464 A1 2/2012 Kragelund et al.
2012/0053555 A1 3/2012 Ariagno et al.
2012/0089088 A1 4/2012 Foshee et al.
2012/0127824 A1 5/2012 Petrone
2013/0046270 A1 2/2013 Foshee et al.
2013/0284735 A1* 10/2013 Oesterle ................. B65D 71/50 220/23.4
2014/0021076 A1 1/2014 Soma et al.

(56) References Cited

U.S. PATENT DOCUMENTS

| | | | |
|---|---|---|---|
| 2015/0005734 A1 | 1/2015 | Inoue et al. |
| 2016/0015889 A1 | 1/2016 | Caquias et al. |
| 2016/0081308 A1 | 3/2016 | Cary et al. |
| 2016/0266156 A1 | 9/2016 | Brennan et al. |
| 2017/0020784 A1 | 1/2017 | Schweiss et al. |
| 2020/0155413 A1 | 5/2020 | Schweiss et al. |
| 2020/0170884 A1 | 6/2020 | Tashjian |
| 2021/0172923 A1 | 6/2021 | Kaufman et al. |
| 2021/0369958 A1 | 12/2021 | Jones et al. |

FOREIGN PATENT DOCUMENTS

| | | | |
|---|---|---|---|
| CN | 103402481 A | 11/2013 |
| CN | 103990201 A | 8/2014 |
| CN | 108040465 A | 5/2018 |
| CN | 108093623 A | 5/2018 |
| CN | 20180503853.6 | 9/2018 |
| CO | 7061051 A2 | 9/2014 |
| CO | 14277741 | 12/2014 |
| DE | 202009012540 U1 | 10/2010 |
| EP | 0 495 808 B1 | 7/1992 |
| EP | 0 631 816 A1 | 1/1995 |
| EP | 0 734 963 B1 | 10/1996 |
| FR | 2 085 307 A1 | 12/1971 |
| FR | 2 715 131 A1 | 7/1995 |
| JP | 08-324571 A | 12/1996 |
| JP | 2002-011097 A | 1/2002 |
| JP | 2012-528692 A | 11/2012 |
| JP | D1463610 | 3/2013 |
| JP | 2014-504921 A | 2/2014 |
| JP | 2015-503964 A | 2/2015 |
| JP | 2015-509421 A | 3/2015 |
| JP | D2016-11117 | 5/2016 |
| JP | 2018-519141 A | 7/2018 |
| RU | 2136326 C1 | 9/1999 |
| TW | 455382 | 9/2001 |
| TW | 201707670 A | 3/2017 |
| TW | D194378 | 12/2018 |
| WO | WO 93/01739 A1 | 2/1993 |
| WO | WO 94/27669 A1 | 12/1994 |
| WO | WO 1996/032917 A1 | 10/1996 |
| WO | WO 99/27886 A1 | 6/1999 |
| WO | WO 03/054552 A2 | 7/2003 |
| WO | WO 2004/032808 A2 | 4/2004 |
| WO | WO 2009/083347 A1 | 7/2009 |
| WO | WO 2010/043683 A1 | 4/2010 |
| WO | WO 2010/141632 A2 | 12/2010 |
| WO | WO 2012/102216 | 8/2012 |
| WO | WO 2013/126055 A1 | 8/2013 |
| WO | WO 2013/162959 A1 | 10/2013 |
| WO | WO 2015/006822 A1 | 1/2015 |
| WO | WO 2016/011450 A1 | 1/2016 |
| WO | WO 2016/205687 A1 | 12/2016 |

OTHER PUBLICATIONS

International Preliminary Report on Patentability dated Nov. 6, 2014 in connection with International Application No. PCT/US2013/036879.

Extended European Search Report dated Aug. 6, 2019 in connection with European Application No. 19169568.3.

International Search Report and Written Opinion dated Aug. 17, 2016 in connection with International Application No. PCT/US2016/038136.

International Preliminary Report on Patentability dated Dec. 28, 2017 in connection with International Application No. PCT/US2016/038136.

Invitation to Pay Additional Fees mailed Feb. 26, 2020 in connection with International Application No. PCT/US2019/052572.

International Search Report and Written Opinion dated Jun. 24, 2020 in connection with International Application No. PCT/US2019/052572.

International Preliminary Report on Patentability dated Apr. 15, 2021 in connection with International Application No. PCT/US2019/052572.

Invitation to Pay Additional Fees mailed Jan. 9, 2020 in connection with International Application No. PCT/US2019/052574.

International Search Report and Written Opinion dated Mar. 2, 2020 in connection with International Application No. PCT/US2019/052574.

International Preliminary Report on Patentability dated Apr. 15, 2021 in connection with International Application No. PCT/US2019/052574.

Columbian Office Action dated Jul. 26, 2019 and English summary thereof in connection with Columbian Application No. NC2017/0012908.

Chinese Office Action dated Jan. 16, 2020 with English translation in connection with Chinese Application No. 201680035766.0.

U.S. Appl. No. 15/186,061, filed Jun. 17, 2016, Schweiss et al.

U.S. Appl. No. 16/746,583, filed Jan. 17, 2020, Schweiss et al.

U.S. Appl. No. 17/282,042, filed Apr. 1, 2021, Jones et al.

U.S. Appl. No. 29/740,759, filed Jul. 7, 2021, Jones et al.

PCT/US2013/0368769, dated Jul. 26, 2013, International Search Report and Written Opinion.

PCT/US2013/0368769, dated Nov. 6, 2014, International Preliminary Report on Patentability.

EP 19169568.3, dated Aug. 6, 2019, Extended European Search Report.

PCT/US2016/038136, dated Aug. 17, 2016, International Search Report and Written Opinion.

PCT/US2016/038136, dated Dec. 28, 2017, International Preliminary Report on Patentability.

PCT/US2019/052572, dated Feb. 26, 2020, Invitation to Pay Additional Fees.

PCT/US2019/052572, dated Jun. 24, 2020, International Search Report and Written Opinion.

PCT/US2019/052572, dated Apr. 15, 2021, International Preliminary Report on Patentability.

PCT/US2019/052574, dated Jan. 9, 2020, Invitation to Pay Additional Fees.

PCT/US2019/052574, dated Mar. 2, 2020, International Search Report and Written Opinion.

PCT/US2019/052574, dated Apr. 15, 2021, International Preliminary Report on Patentability.

U.S. Appl. No. 18/316,151, filed May 11, 2023, Schweiss et al.

* cited by examiner

PACKAGING FOR MULTIPLE CONTAINERS

CROSS-REFERENCE TO RELATED APPLICATIONS

This application claims the benefit under 35 U.S.C. § 119(e) of U.S. Provisional Application 62/740,490, filed on Oct. 3, 2018, which is incorporated herein by reference in its entirety.

FIELD

Disclosed embodiments are related to packaging for multiple containers.

BACKGROUND

Medicinal fluids are often manufactured and packaged separately prior to use to preserve their chemical and physical stability. The medicinal fluids may be combined during administration, either by mixing the medicinal fluids immediately prior to administration or by administering the medicinal fluids concurrently or sequentially.

Typically, these additional steps during administration are performed by a nurse or other medical professional, who may need to follow a specialized procedure to administer the medicinal fluids to a patient. In cases where additional medicinal fluids are needed, the method of administration may be performed by the nurse or other medical professional multiple times for a predetermined dosage.

Conventional packaging for medicinal fluids may be bulky and cumbersome. In cases where multiple medicinal fluids are used in an administration process, separate containers may be procured and handled individually. Accordingly, administration methods and systems using medicinal fluids with conventional packaging may lack a streamlined procedure and may require many steps connecting and disconnecting components and moving fluid through various components in a specific manner. The inventors have recognized the need for a container unit that simplifies administration of medicinal fluid from multiple containers to a patient.

SUMMARY

In some embodiments, systems and methods for administering multiple medicinal fluids to a patient with a container unit including multiple containers are provided. In some embodiments, a container unit includes a first container, a second container, and a carrier which holds the first container and the second container stationary relative to each other. In some embodiments the carrier includes a protruding lip configured to engage with a pooling device to secure the container unit to the pooling device. In some embodiments, the carrier includes a slot configured to engage with an insert on the pooling device to guide the container unit as the container unit is secured to the pooling device. In some embodiments, the carrier includes a first portion and second portion with different shapes that are complementary to a shape of a port on the pooling device. In some embodiments, the carrier includes an extension which extends in a direction away from one of the first container to a level that is at least even with a stopper disposed in the first container.

In one embodiment, a container unit for storing medicinal fluid and interfacing with a pooling device includes a first container having a first internal volume and a first opening, a second container having a second internal volume and a second opening, and a carrier configured to hold the first container and second container stationary relative to one another. The carrier includes a lip protruding from at least a portion of an outer circumference of the carrier, and the lip is configured to engage a latch of the pooling device to attach the container unit to the pooling device. The lip is configured to resist separation of the container unit from the pooling device when the lip is engaged by the latch.

In another embodiment, a container unit for storing medicinal fluid and interfacing with a pooling device includes a first container having a first internal volume and a first opening, a second container having a second internal volume and a second opening, and a carrier configured to hold the first container and second container stationary relative to one another. The carrier includes a slot that is disposed between the first container and the second container and is configured to receive an insert of a pooling device. The slot has a shape complementary to the insert and is configured to resist force applied to the carrier in at least one transverse direction when the slot has received the insert.

In yet another embodiment, a container unit for storing medicinal fluid and interfacing with a pooling device includes a first container having a first internal volume and a first opening, a second container having a second internal volume and a second opening, and a carrier configured to hold the first container and second container stationary relative to one another. The carrier includes a first portion engaged with the first container and a second portion engaged with the second container. The first portion has an outer circumferential surface having a first shape and the second portion has an outer circumferential surface having a second shape, the first and second shapes being different.

In still yet another embodiment, a container unit for storing medicinal fluid and interfacing with a pooling device includes a first container having a first internal volume and a first opening with a first stopper, where the first stopper has a first end facing toward the first internal volume and a second end facing away from the first internal volume, a second container having a second internal volume and a second opening with a second stopper, where the second stopper has a first end facing toward the second internal volume and a second end facing away from the second internal volume, and a carrier including an extension. The carrier is configured to hold the first container and second container stationary relative to one another, and the extension extends in a direction away from the first internal volume to a level that is at least even with the second end of the first stopper.

In still yet another embodiment, a container unit for storing medicinal fluid includes a first container having a first internal volume and a first opening defined by a first plane, a second container having a second internal volume and a second opening defined by a second plane, a carrier configured to hold the first container and second container stationary relative to one another, and a lid having a first portion removably positioned over the first opening and a second portion removably positioned over the second opening. The lid includes at least one rotation inhibitor configured to prevent rotation of the lid about a first axis extending in a direction perpendicular to the first opening when the first portion of the lid is positioned over the first opening and the second portion of the lid is spaced from the carrier.

In still yet another embodiment, a plurality of container units for storing medicinal fluid and interfacing with a pooling device includes a first container unit having a first container with a first internal volume and a first opening, a second container having a second internal volume and a second opening, and a first carrier configured to hold the first container and second container stationary relative to one another. The first carrier includes a first interface portion disposed proximate the first opening and second opening. The plurality of container units also includes a second container unit having a third container having a third internal volume and a third opening, a fourth container having a fourth internal volume and a fourth opening, and a second carrier configured to hold the third container and fourth container stationary relative to one another. The second carrier includes a second interface portion disposed proximate the third opening and fourth opening. The combined volume of the first internal volume and the second internal volume is different from the combined volume of the third internal volume and the fourth internal volume, and the first interface portion and the second interface portion are congruent.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
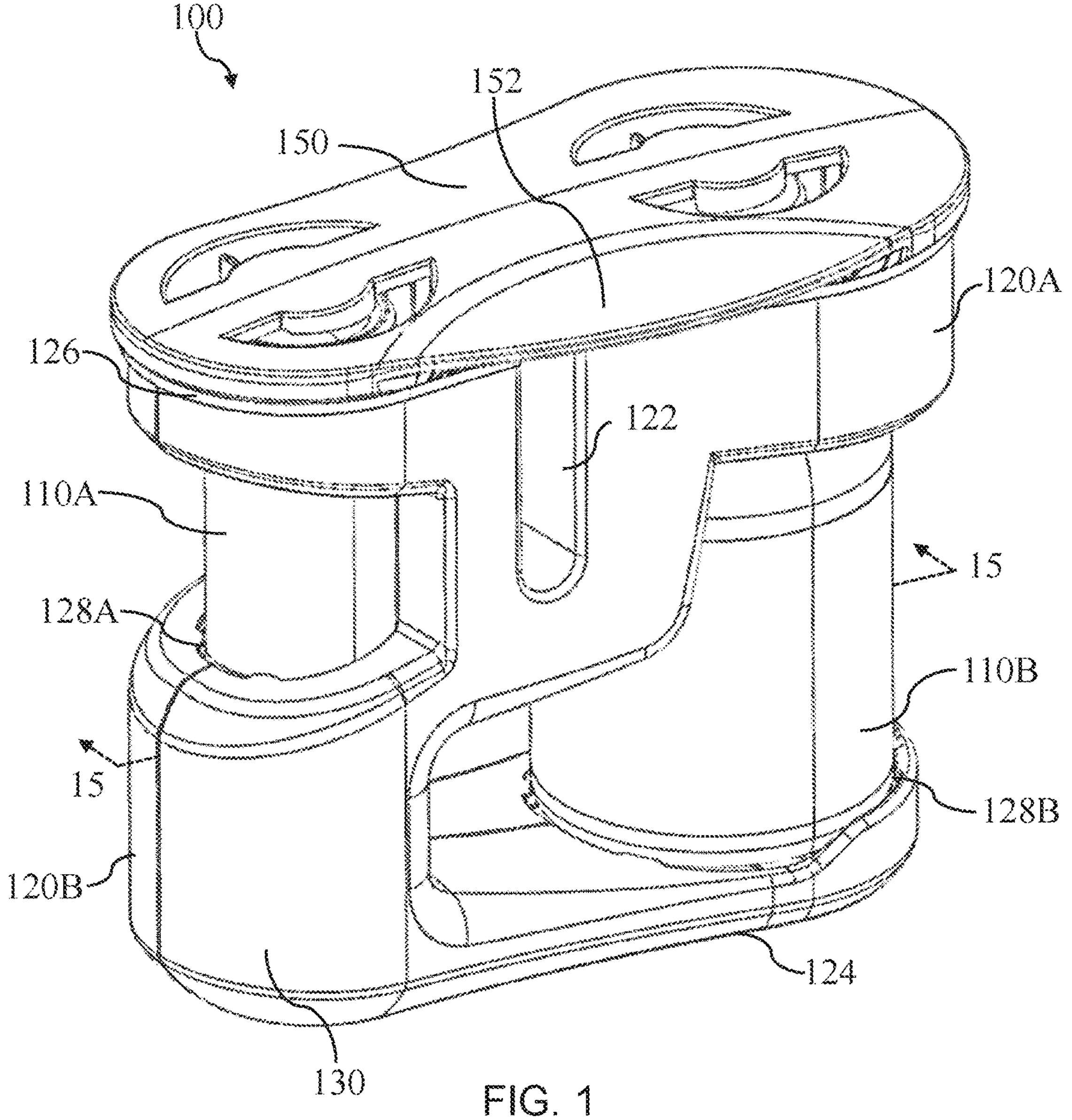
FIG. 1 depicts one embodiment of a container unit.

During a typical administration process, multiple syringes may be used to mix medicinal fluids in a series of steps prior to injection into a patient. At each step, a nurse, physician, or other medical professional takes care to ensure sterility as the individual fluids are withdrawn from their individual packaging and expelled into a mixing container. Even if the medicinal fluids do not need to be pre-mixed prior to injection into a patient, each fluid is typically withdrawn from an individual container by a pump, syringe, or other suitable tool. If a dosage larger than that contained in a typical container is required for a particular patient, the process is typically repeated multiple times until the required dosage is reached. Accordingly, conventional administration methods performed by medical professionals typically use multiple individual containers of medicinal fluid which can be time consuming and complicated.

In some treatments, multiple medicinal fluids are administered to a patient in a predetermined volumetric ratio in a mixture or in sequence. Containers of medicinal fluids typically are supplied separately, and a particular dosage may be measured out by a medical professional. Accordingly, significant time and effort is spent procuring and preparing the particular dosage for a patient. This time and effort may be further compounded for some patients who may require dosages larger than what is supplied in a standard container, where a medical professional may be required to pool medicinal fluids across a range of differently sized containers. Upon completion of a fluid administration process, a medical professional may manage a large amount of container and medicinal fluid waste as a result of a single treatment.

In some cases, due to the frequency of treatment using some medicinal fluids, self-administration is a preferable option for convenience and cost. Difficult procedures which are already time consuming when performed by medical professionals can be challenging for a patient practicing self-administration. For example, a patient may need to procure and handle a multitude of containers of medicinal fluid for a single administration process which may be difficult and time consuming. Accordingly, reducing the time consumption and complexity of medicinal fluid administration is desirable to self-administering patients for improved convenience and a reduced impact on day-to-day life.

In view of the above, the inventors have recognized the benefits of a container unit which allows a patient to administer multiple medicinal fluids that are separately contained in different containers. As compared to a conventional administration process, the container unit may enable the use of a simpler medicinal fluid administration process having less steps. The container unit may also allow for administration of a dosage with a predetermined ratio of medicinal fluid so that medicinal fluid preparation for a predetermined dosage is simplified. A container unit may include a first container, a second container, and a carrier configured to house the first container and the second container and hold them stationary relative to each other. The carrier may include features that allow the container unit to cooperate with a pooling device to further simplify the administration of medicinal fluids from one or more container units.

The inventors have also recognized the benefits of a container unit including a lip for attaching the container unit to an associated pooling device. The lip may engage a latch of the associated pooling device to attach the container unit to the pooling device. Accordingly, a patient may quickly and reliably attach containers of medicinal fluid to a pooling device to administer multiple medicinal fluids for treatment.

In some embodiments, a container unit includes a first container, a second container, and a carrier configured to hold the first container and second container stationary relative to one another. The carrier may include a lip protruding from at least a portion of an outer circumference of the carrier. The lip may be configured to engage a latch of an associated pooling device when the container unit is connected to the pooling device. After the lip has engaged the latch, the lip may resist separation of the container unit from the pooling device so that the container unit is secured to the pooling device. In some embodiments, the lip may protrude from a portion of the outer circumference disposed around a first opening of the first container and/or a second opening of the second container. Such an arrangement may provide separation resistance near an interface between the first and second containers and the pooling device.

The inventors have also recognized the benefits of a container unit including a carrier with a slot disposed between a first container and a second container. The slot may be configured to receive an insert from an associated pooling device. Such an arrangement may prevent accidental removal of a container unit while in use, and may also promote reliable and quick connection of a container unit to a pooling device to administer medicinal fluids for treatment.

In some embodiments, a container unit includes a first container, a second container, and a carrier configured to hold the first container and second container stationary relative to one another. The carrier may also include a slot disposed between the first container and the second container. The slot may be configured to receive an insert of an associated pooling device and may have a shape complementary to the shape of the insert. According to this embodiment, when the insert is received by the slot, the slot may resist forces applied to the container unit in one or more transverse directions. The slot may be used to guide the container unit as it is moved towards the pooling device to connect the container unit to the pooling device. By guiding the container unit, the slot may facilitate reliable fluidic connection between the first and second containers and the pooling device. In some embodiments, the slot may include an interior wall which is configured to engage a channel in the insert, thereby providing additional guiding surfaces between the container unit and the associated pooling device.

The inventors have also recognized the benefits of a container unit including a carrier with a first portion and a second portion, where the first portion has an outer circumferential surface with a first shape and the second portion has an outer circumferential surface with a second shape. Such an arrangement may promote attachment of a container unit in an appropriate orientation to an associated pooling device and may also promote reliable and quick connection of the container unit to the pooling device.

In some embodiments, a container unit includes a first container, a second container, and a carrier configured to hold the first container and second container stationary relative to one another. The carrier may include a first portion with a first shape and a second portion with a second, different shape. The first and second portions may be configured so that their combined shape is complementary to the shape of a port on an associated pooling device. As the first shape and second shape are different, the container unit may have predetermined orientation in which the container unit is connectable to the pooling device. In some embodiments, as the first and second portions may be shaped complementary to the shape of a port of a pooling device, the port may engage the first and second portions to guide the container unit as the container unit is connected to the pooling device. In some embodiments, the first shape and second shape may be ellipsoidal, where the first shape has a first radius and the second shape has a different, second radius.

The inventors have also recognized the benefits of a container unit including a first container, a second container, and a carrier with an extension. The extension may extend in a direction away from a first internal volume of the first container to a level that is at least even with a first stopper of the first container. The extension may contact an associated pooling device to resist insertion of the container unit into the pooling device. Such an arrangement may promote reliable insertion depth of a spike of the pooling device.

In some embodiments, a container unit includes a first container with a first stopper, a second container with a second stopper, and a carrier configured to hold the first container and second container stationary relative to one another. The carrier may have an extension that extends away from the first container to a level at least even with the first stopper. More specifically, according to these embodiments, the extension may extend in a direction away from a first internal volume of the first container to a level at least even with an end of the first stopper that faces away from the first internal volume. Thus, the offset between the extension and the end of the first stopper may be greater than or equal to zero. The extension may be configured to contact a surface on an associated pooling device to resist further insertion of a spike of the pooling device into the first container when the extension contacts the pooling device. Accordingly, the extension may set a predetermined insertion (i.e., piercing) depth of a spike of a pooling device to promote effective sealing and fluidic connection between the first and second containers and the pooling device.

In some embodiments, an appropriate offset between an extension of a container unit and a first stopper of a first container held by said carrier (i.e., a distance which the extension extends past an end of the first stopper in a direction away from the first container) may be greater than or equal to approximately 0 mm, 0.25 mm, 0.75 mm, 1 mm, 1.5 mm, 2 mm, 2.5 mm, or any other suitable offset. Correspondingly, an offset between an extension of the carrier and the first stopper may be less than or equal to approximately 2.75 mm, 2.25 mm, 1.75 mm, 1.25 mm, 0.75 mm, 0.5 mm, 0.1 mm, or any other suitable offset. Combinations of the above noted ranges are contemplated including, for example, offsets between or equal to 1 mm and 2 mm, 0 mm and 2 mm, 0.5 mm and 1.5 mm, as well as 1.5 mm and 2.5 mm. Of course, any suitable offset may be used including distances both greater than and less than those noted above as the present disclosure is not so limited.

In some embodiments, a container unit includes a first container, a second container, a carrier, and a lid. The first and second containers may each include an internal volume, a stopper, and a seal. The stopper may be disposed in an opening of the container, and the seal may cover the stopper to provide protection for the stopper prior to use of the container unit. The first and second containers may have different internal volumes and may hold different medicinal fluids for administration to a patient. In some embodiments, the volume of the first container and the second container may be related by a predetermined ratio. The carrier may be configured to hold the first container and the second container stationary relative to one another. The carrier may include a first section and a second section which may be connected around the first container and the second container to secure the first and second containers in the carrier. The first section and second section may include section latches and section latch receptacles configured to secure the first section to the second section when they are brought together. The first section and the second section may also include one or more alignment members to guide and promote appropriate alignment of the section latches and section latch receptacles. In some embodiments, the carrier may include a bottom disposed over and extending between bottommost portions of the first and second container. The lid may be disposed over a top portion of the carrier where the stoppers and seals of the first and second containers are disposed so that the lid may protect the seals and stoppers of the first and second containers. In some embodiments, the lid may be disposed at least partially around the seals of the first and second containers, so that removal of the lid may also remove the seals and reveal the stoppers. The lid may include a tab configured to facilitate lifting and removal of the lid and, in some embodiments, seals.

In some embodiments, a medicinal fluid pooling device includes a housing with a plurality of ports as well as at least one fluid distribution system. The plurality of ports may include spikes or other fluidic connectors suitable to fluidly connect one or more containers of medicinal fluid to the at least one fluid distribution system. The ports may include multiple spikes which may be used to fluidly connect multiple containers packaged together in a container unit. The fluid distribution system may include an air filter, tubing, and a fluidic connector of a fluidic interface used to withdraw fluid from the one or more containers once they have been fluidly connected to the fluid distribution system. The ports may be configured to receive one or more container units in an inverted position so that gravity may be used to supply the medicinal fluid from the containers to the fluidic connector. The fluid distribution system may supply a single medicinal fluid from multiple containers connected to different ports, or may supply a mixture of different medicinal fluids connected to different ports. The air filter may allow air into the fluid distribution system to replace any volume of fluid withdrawn from the fluidic connector. The fluidic connector may be configured to connect to any patient device that may be used to administer fluid to a patient, such as an infusion pump or syringe.

In some embodiments, a method for administering a medicinal fluid using a medicinal pooling device includes connecting one or more container units to the one or more ports, and coupling a patient device to a fluidic connector of a fluid distribution system to withdraw the medicinal fluid from two or more containers disposed within the container unit. The ports of the medicinal pooling device may include one or more spike assemblies, each spike assembly including a hollow spike and a spike sheath covering the spike. When the cover is removed and the spike assemblies are exposed, connecting a container to a spike may include pushing the container of the container unit onto the spike, causing the spike sheath and the container to be pierced by the spike to allow fluidic communication between the spike and an internal volume of the container. Once a container unit is connected, medicinal fluid from the container may flow through the spike and coupled tubing to the fluidic connector which may be used to connect the fluid distribution system to an infusion pump, syringe, or other device for administration of the fluid into a patient. If more than one container unit is connected to the fluid distribution system, the total volume of fluid in each of the connected containers of the container units may be combined and delivered as a single volume at the fluidic connector. In cases where multiple containers are used, the spike sheath may form a seal against the spike to contain any medicinal fluid within the spike sheath and spike prior to the spike piercing the container which may allow the containers to be pierced sequentially or non-sequentially without any loss of medicinal fluid. In some embodiments, multiple fluid distribution systems may be used in the medicinal pooling device to deliver different medicinal fluids or to provide a mixture of different medicinal fluids.

In some embodiments, a method of manufacturing a container unit includes obtaining a first container, a second container, and a carrier including a first section and a second section. The method further includes placing the first container and the second container into a first indentation and a second indentation of the first section configured to receive the first and second containers, respectively. When the first and second containers are placed in the first section, the second section may be placed over the first and second container so that first container and second container and held stationary relative to one another in the carrier. In some embodiments, the method may include aligning the first section and the second section so that section latches on one of the sections align with section latch receptacles on the other section. These section latches and receptacles may be used to secure the first section and second section together around the first and second containers. In some embodiments, the first and second sections may be secured together with a mechanical press which applies force to the first and second sections to engage corresponding section latches and receptacles. The method of manufacturing may be performed manually, semi-autonomously, or fully autonomously, as the present disclosure is not so limited.

In some embodiments, an appropriate volume of a container of a container unit may be greater than or equal to approximately 1.25 mL, 2.5 mL, 5 mL, 10 mL, 25 mL, 50 mL, 100 mL, 200 mL, 300 mL, or any other suitable volume. Correspondingly, a volume of a container may be less than or equal to approximately 350 mL, 250 mL, 150 mL, 75 mL, 35 mL, 15 mL, 7.5 mL, 3 mL, 1.5 mL, or any other suitable volume. Combinations of the above noted ranges are contemplated including, for example, volumes between or equal to 1.25 mL and 15 mL, 25 mL and 300 mL, 100 mL and 350 mL, as well as 1.25 mL and 50 mL. Of course, any suitable volume may be used including volumes both greater than and less than those noted above as the present disclosure is not so limited.

In some embodiments, a container unit may be used with a pooling device to administer medicinal fluids from multiple containers within the container unit. An example of a pooling device that may be used with the container unit described herein is described in Ser. No. 15/186,061, entitled "POOLING DEVICE FOR SINGLE OR MULTIPLE MEDICAL CONTAINERS," filed with the U.S. Patent and Trademark Office on Jun. 17, 2016, and incorporated herein by reference. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

While embodiments described herein may relate to a container unit in use with a pooling device, any appropriate tool or mechanism may be employed to administer medicinal fluids from a container unit. For example, a pump, syringe, or other suitable tool may also be used to withdraw and administer medicinal fluids from a container unit. According to these examples, a pump, syringe, or other tool may be directly coupled to one or more containers of the container unit. In such an arrangement, a container unit may provide simplified packaging and access to multiple medicinal fluids. Of course, the container unit may be used with any suitable administration device, tool, or system, as the present disclosure is not so limited.

FIG. 1 depicts one embodiment of a container unit 100 including a first container 110A, a second container 110B, and a carrier formed of a first section 120A and second section 120B. The carrier includes a slot 122, a bottom 124, a lip 126, indentations 128A, 128B, and a handle 130. The slot 122 is formed in the carrier and is configured to receive an insert of a medicinal pooling device having a complementary shape to guide the container unit into a port of the pooling device. The bottom 124 covers bottommost portions (for example, see FIG. 3) of each of the containers and extends between said bottommost portions. Accordingly, the bottom creates a substantially continuous surface between the bottommost portions of the first and second containers which may be used by a patient or medical professional to apply force to the container unit. The lip 126 protrudes out of an outer circumference of the container unit. More specifically, according to the embodiment of FIG. 1, the lip protrudes out of an uppermost portion of the carrier disposed near openings of the first and second containers. The indentations 128A, 128B are configured to receive and hold the first container and second container in the carrier. The indentations may include high-friction materials, compressible materials, or other suitable arrangements for keeping the first container stationary relative to the second container. In some embodiments, the first and second containers may be rotatable about a longitudinal axis but may be held translationally stationary by the carrier. The handle 130 and/or bottom 124 (including a hollow portion between the first container and the second container) may be easily used by a patient or other medical professional to grasp the carrier to manipulate the container unit.

As shown in the embodiment of FIG. 1, the container unit 100 also includes a lid 150 with a tab 152. The lid is removably attached to the carrier formed by sections 120A, 120B of the container unit and rests on the lip 126. The tab may be used to lift and remove the lid from the carrier to reveal the first container and the second container opening. In some embodiments, the first container and the second container may each include a stopper as well as a seal covering and protecting the stopper (for example, see FIG. 3). In this embodiment, one or more container engaging fingers (not shown in the figure) may engage the seals of the containers and may be configured to remove the seals when the lid is removed from the carrier. That is, by lifting the tab 152, the seals on each of the containers 110A, 110B may be broken and/or removed to reveal the containers and their associated stoppers. The lid 150 may provide protection for the first and second containers until the container unit is ready for use.

Figure 2:
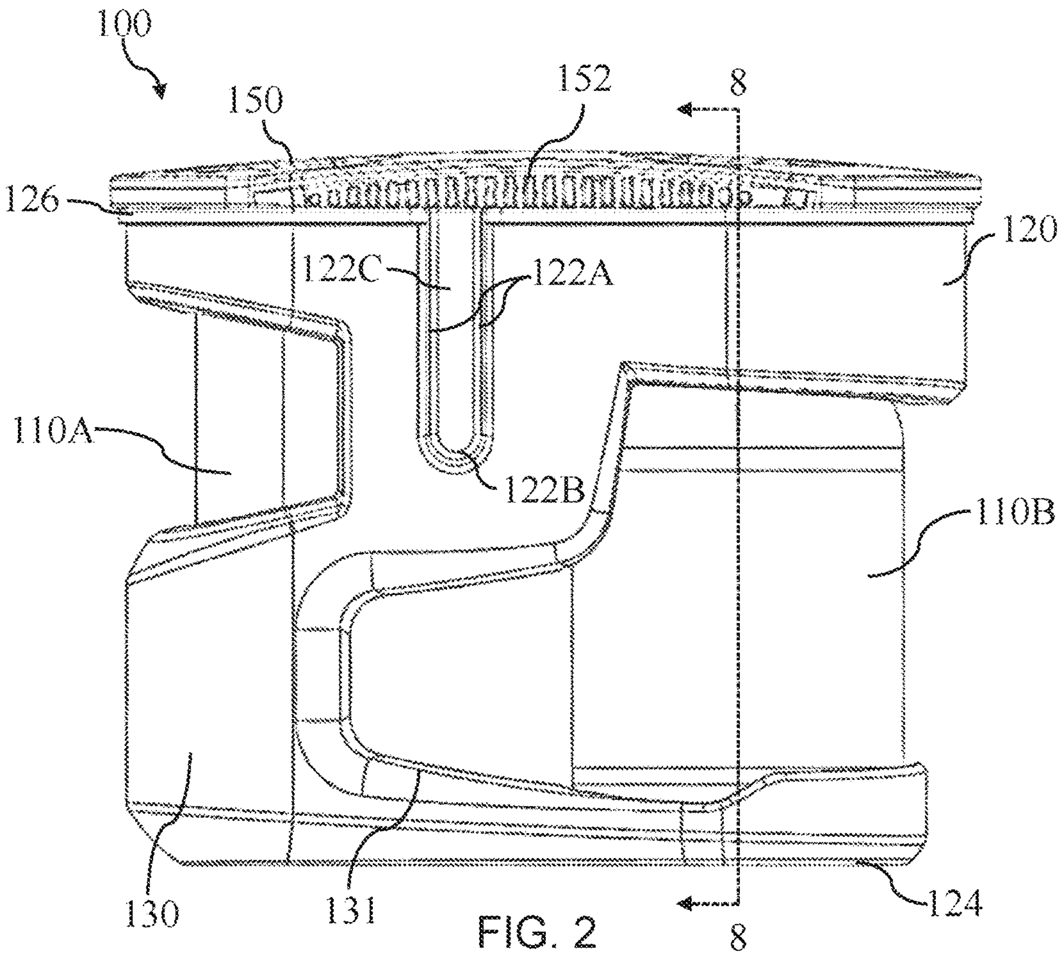
FIG. 2 is a front view of the container unit of FIG. 1.

FIG. 2 is a front view of the container unit 100 of FIG. 1. As shown in FIG. 2, the slot includes side walls 122A, a curved wall 122B, and an interior wall 122C. Accordingly, the slot defines at least three sides of a rectangular prism with the interior wall and the side walls. The curved wall defines a horizontal cylindrical segment positioned on a proximal end of the slot. According to the embodiment shown in FIG. 2, an associated pooling device may have an insert with a shape complementary to that of the slot. That is, the insert may include at least three walls of a rectangular prism and a horizontal cylindrical segment disposed on a distal end of the insert. Accordingly, the slot may guide the container unit as the container unit is connected to the associated pooling device to promote effective alignment and orientation of the container unit.

As shown in FIG. 2, the handle 130 provides adequate space for a patient or medical professional to grasp the container unit. For example, the container unit may be gripped around the bottom 124, around the first container 110A, or around the second container 110B. Accordingly, the handle may allow the container unit to be more easily handled when it is inserted into a pooling device, otherwise coupled to another medical device, or moved around. As each of the containers may be pierced to gain access to the medicinal fluid disposed therein, stability provided by the handle may be desirable. For example, the handle may be grasped while removing the lid 150, to flip the container unit over, and to insert the container unit into a pooling device to pierce both of the containers. As shown in FIG. 2, the handle is cylindrically shaped, but any suitable shape may be employed that simplifies handling of the container unit.

Figure 3:
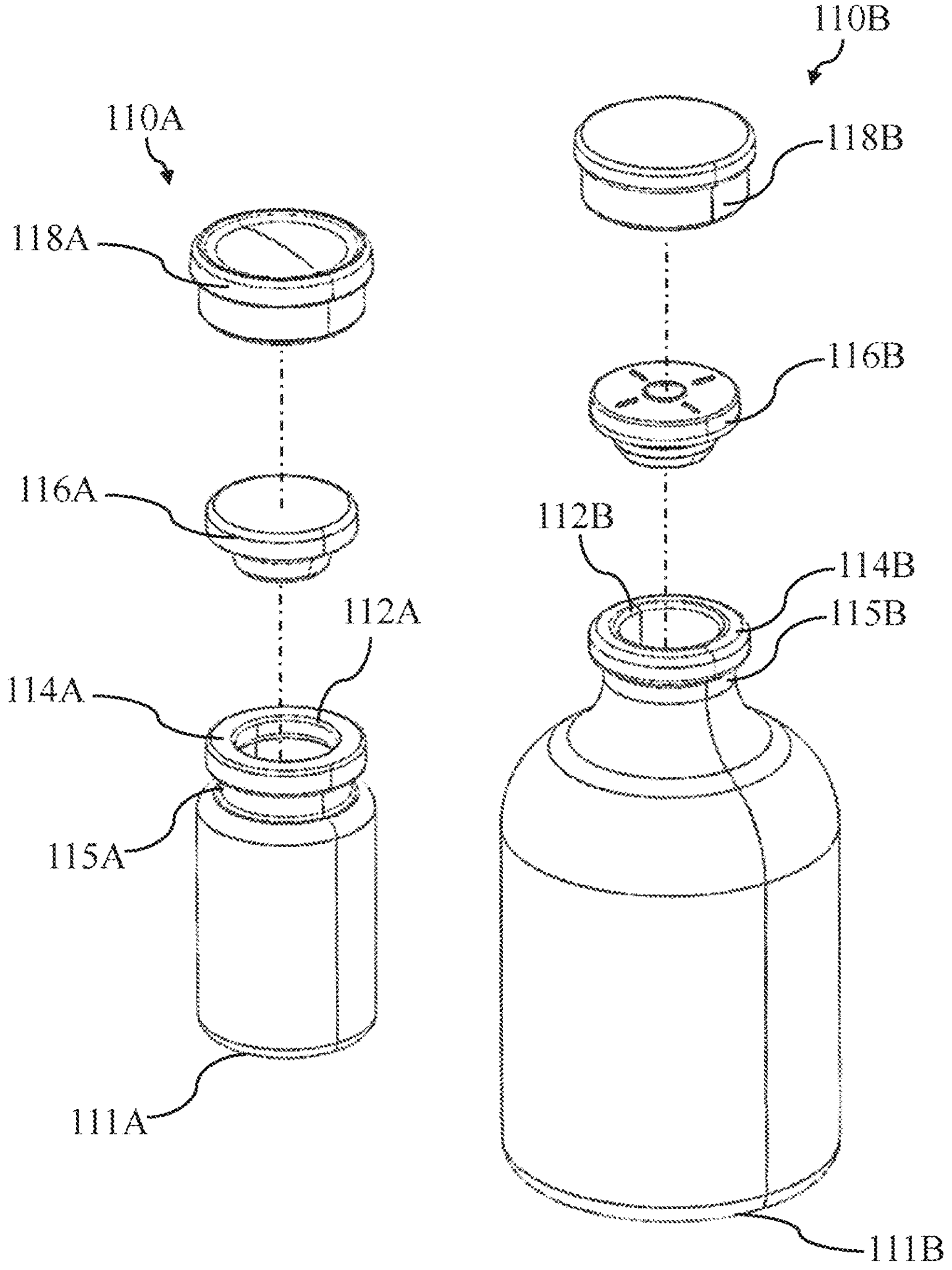
FIG. 3 depicts an exploded view of an embodiment of a first container and a second container.

FIG. 3 depicts an exploded view of an embodiment of a first container 110A and a second container 110B. The first container includes a first opening 112A to a first internal volume, where the first opening is defined by a first plane, a container lip 114A, a stopper 116A, a seal 118A, a bottommost portion 111A, and a neck 115A. The stopper is configured to be inserted into the opening to fluidly seal the first internal volume and rests on the container lip. The seal is configured to fit over both the stopper and the extension so that the stopper stays seated in the opening. Accordingly, the seal 118A is a protective element that may be left in place until the container is ready to be coupled to another medical device. In some embodiments, the stopper 116A may be composed of a material suitable to be pierced by a needle or spike, such as a natural or synthetic rubber. Of course, the stopper may be composed of any suitable material for sealing the opening 112A, as the present disclosure is not so limited. In some embodiments, the stopper may not rest on the container lip 114A, and may be fully disposed within the opening 112A, as the present disclosure is not so limited.

As shown in FIG. 3, the second container 110B includes components similar to those of the first container 110A. The second container includes a second opening 112B defined by a second plane, a second container lip 114B, a second stopper 116B, a second seal 118B, a second bottommost portion 111B, and a second neck 115B. The second stopper is configured to be inserted into the second opening to seal a second internal volume in a similar manner to that of the first container. The second seal is disposed around the stopper and the container lip to secure the stopper within the second opening prior to the container being ready for use during an administration process. As shown in FIG. 3, the first stopper 116A and second stopper 116B may include variations dependent on the size of container and type of medicinal fluid disposed therein. Similarly, the seals may be different depending on the shape of the container lip of the container so that the stopper may be securely held in the opening. For example, the second stopper includes ridges to promote sealing as well as markings. The stoppers and seals may use any appropriate configuration that effectively seals and protects the opening of the containers, as the present disclosure is not so limited.

According to the embodiment shown in FIG. 3, an administration process of medicinal fluid from the first container 110A and second container 110B may include manipulating the seals 118A, 118B and/or the stoppers 116A, 116B. In some embodiments, an administration process may include removing the first seal 118A and the second seal 118B from the first container and the second container, respectively. Once the seals are removed, the stoppers may be exposed so that they may be pierced by a needle or spike of an associated medical device. Of course, the stoppers may also be removed to couple the containers to an associated medical device, or to pour out the contents of the containers, as the present disclosure is not so limited.

Figure 4:
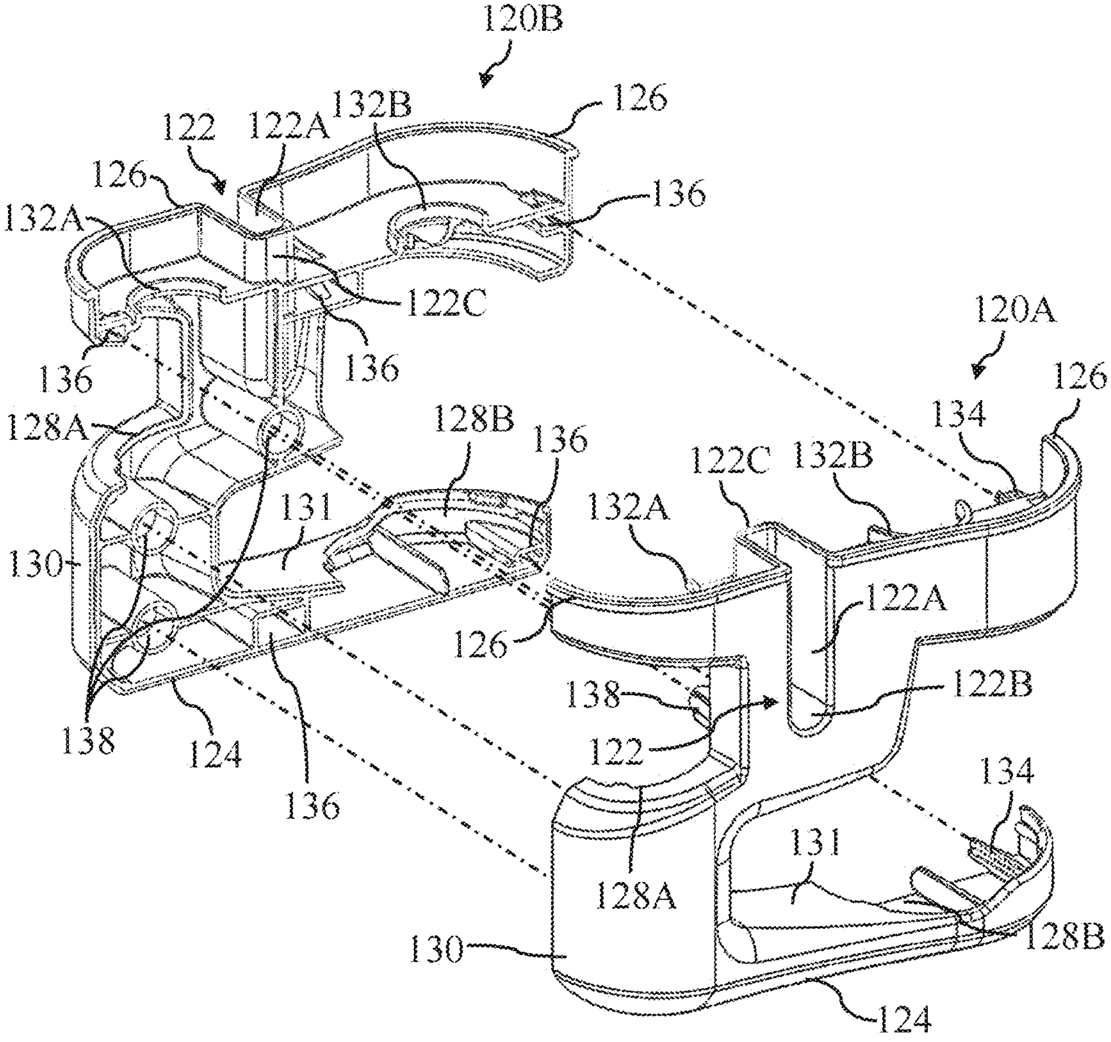
FIG. 4 depicts an exploded view of an embodiment of a container unit.

FIG. 4 depicts an exploded view of an embodiment of a carrier including a first section 120A and a second section 120B. As shown in FIG. 4 and discussed previously, the first section 120A includes a slot 122, a bottom 124, a lip 126, a first indentation 128A, a second indentation 128B, and a handle 130. The slot 122 includes side walls 122A, curved wall 122B, and interior wall 122C. The bottom 124 extends between the first indentation and second indentation which are configured to hold first and second containers, respectively. The lip 126 protrudes out of an outer circumference of an upper portion of the first section.

According to the embodiment of FIG. 4, the first section 120A includes two container neck holders 132A, 132B section latches 134, and alignment members 138. The container neck holders 132A, 132B may cooperate with the first indentation 128A and second indentation 128B to securely hold the first and second containers in the carrier. The container neck holders may engage a neck of the first and second containers (for example, see FIG. 3) to inhibit longitudinal movement of the first and second containers. The section latches 134 protrude out of the first section and are configured to engage section latch receptacles 136 on the second section 120B to secure the first section to the second section. The alignment members 138 of the first section may similarly engage alignment members on the second section to correctly orient the first section relative to the second section and align the section latches with the section latch receptacles.

As shown in FIG. 4, the second section 120B of the carrier includes components complementary to that of the first section 120A. The second section includes a slot 122, a bottom 124, a lip 126, a first indentation 128A, a second indentation 128B, and a handle 130. According to the embodiment of FIG. 4, the first section and second section may combine to create completed components. That is, the slot, bottom, upper lip, first indentation, second indentation, and handle of one of the first section and second section may be a portion of a larger whole that is completed when the first section is secured to the second section. For example, the slot 122 of the first section may combine with the slot of the second section to effectively create a single slot disposed between first and second containers. Similarly, the lip 126 of the second section may combine with the lip 126 of the first section to create a substantially continuous upper lip protruding from the outer circumference of the carrier. As shown in FIG. 4, the second section also includes container neck holders 132A, 132B, section latch receptacles 136, and alignment members 138 which cooperate with corresponding components of the first section. The container neck holders 132A, 132B of the second section may combine with the container neck holders 132A, 132B of the first section to form enclosed spaces for holding the container necks. The section latch receptacles 136 are configured to receive the section latches 134 so that the first section and second section may be combined and secured to one another. Similarly, the alignment members 138 of the second section are configured to receive alignment members of the first section to guide and appropriately orient the first section relative to the second section. It should be noted that, in some embodiments, the alignment members 138 can be reversed such that the alignment members of the first section are configured to receive the alignment members of the second section.

According to the embodiment of FIG. 4, the first section 120A and second section 120B may be configured as equal parts of the carrier. That is, the carrier is split in the first section 120A and the second section 120B approximately down a central longitudinal plane. Such an arrangement may allow first and second containers to be easily enclosed by the carrier by placing the containers in the indentations 128A, 128B of the first section and securing the second section around the containers. In some embodiments, the first section and second section may be asymmetrical or otherwise split into unequal parts. For example, the first section may form more than half of the carrier and the second section may merely function as a cap for the first section to secure the containers in place. In some embodiments, the first section and second section may be split along a transverse plane. For example, the carrier may be split into bottom and top sections so that a container may be placed into the first bottom section and secured in place by the top second section. Of course, any suitable arrangement for the first section and second section may be employed, as the present disclosure is not so limited.

Figure 5:
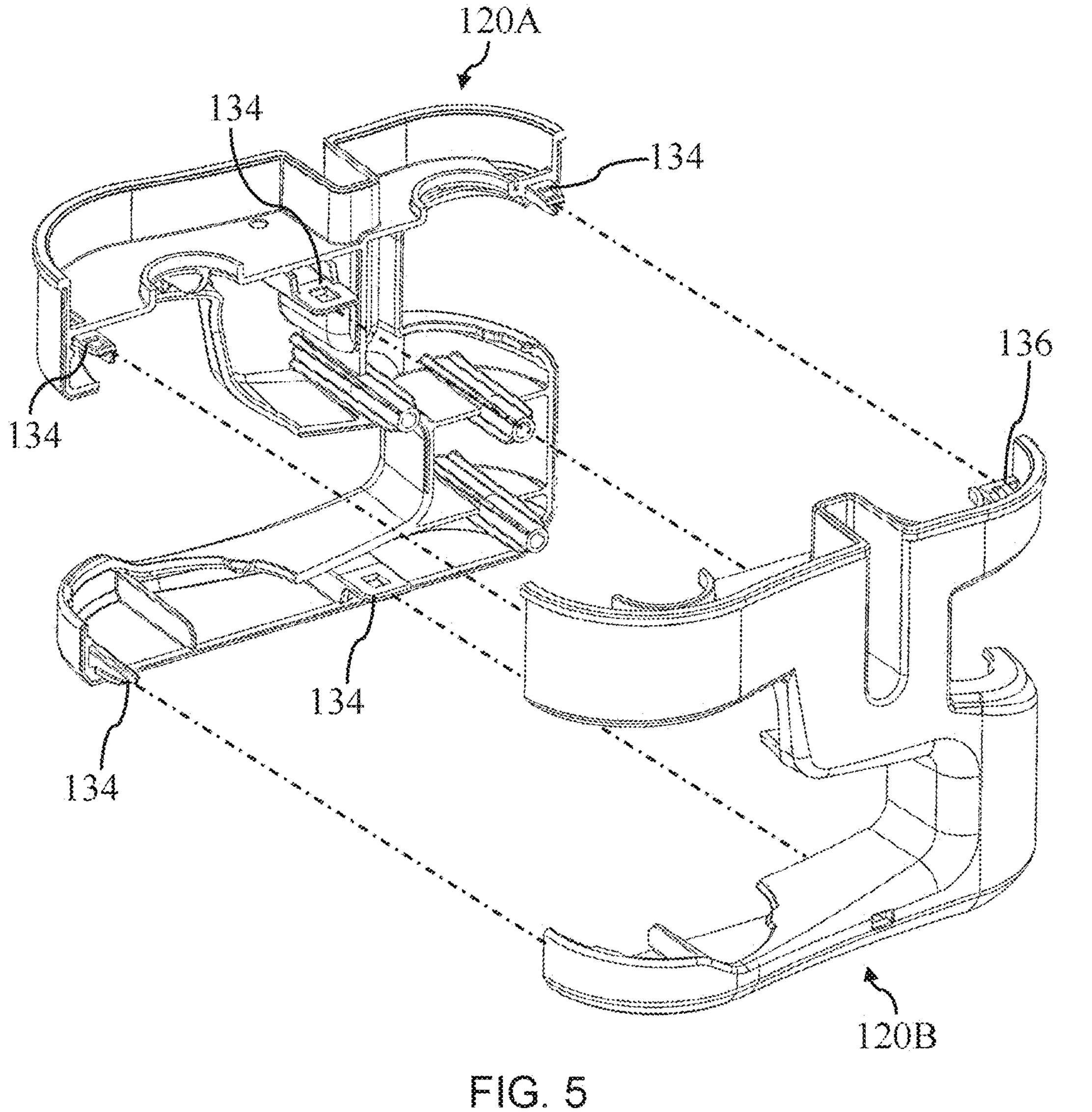
FIG. 5 depicts an exploded alternative view of the container unit of FIG. 4.

FIG. 5 depicts an exploded alternative view of the container unit of FIG. 4, showing the inside of the first section 120A including section latches 134. As discussed previously, the section latches 134 are configured to secure the first section and second section 120B together when the section latches are received by the section latch receptacles 136. According to the embodiment shown in FIG. 5, each of the corresponding section latch and section latch receptacle pairs includes a catch configured to secure a recess or hole. As shown in FIG. 5, the peripheral section latches include a catch (e.g., a barbed end or distal protrusion) configured to be received by a recess or hole in the section latch receptacle (for example, see FIG. 6). In contrast, the central section latches include a hole configured to receive a triangular catch disposed in the corresponding central section latch receptacles (for example, see FIG. 4). As shown in FIG. 5, the rectangular central section latches are larger than the peripheral latches and may provide a majority of the securing force for the first section and second section when inserted into the corresponding section latch receptacle. Of course, the section latches and section latch receptacles may have any suitable arrangement with any suitable securing force distribution, as the present disclosure is not so limited.

Figure 6:
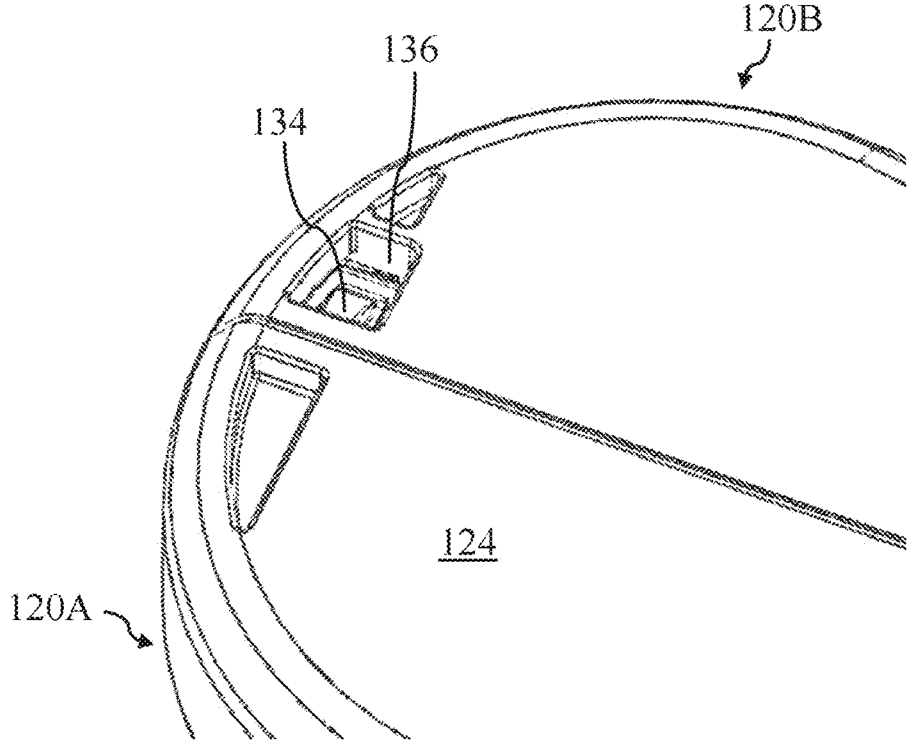
FIG. 6 depicts one embodiment of a latch for a container unit.

FIG. 6 depicts one embodiment of a section latch 134 and a section latch receptacle 136 for a carrier. As shown in FIG. 6, the carrier is split into a first section 120A and a second section 120B. The section latch 134 and section latch receptacle 136 are disposed on a bottom 124 of the carrier. The section latch 134 may include a barbed end or other distal protrusion which may be received by the section latch receptacle 136. The section latch 134 may be elastically deflectable, so that as the section latch is inserted into the section latch receptacle the barbed end deflects out of the way. Once the section latch is fully inserted into the section latch receptacle, a window in the section latch receptacle may receive the barded end so that the section latch may return toward a resting position. Once the section latch has returned toward the resting position, the barbed end may resist forces that may separate the first section from the second section. In the embodiment shown on FIG. 6, the section latch 134 may be depressed to release the section latch from the section latch receptacle 136.

While a latch is shown and described in the embodiment of FIG. 6, any suitable fastener may be used to secure the first section of the carrier to the second section of the carrier. For example, screws, bolts, tacks, rivets, adhesives, or any other suitable fastener may be used to secure the first section to the second section. The fasteners may be removable or substantially permanent. In some embodiments, different fasteners may be used in combination to secure the first section to the second section. For example, combinations may include, but are not limited to, section latches and adhesive, section latches and screws, as well as screws and adhesives. The fasteners may be disposed in any suitable location between the first and second section to effectively secure the first section to the second section.

Figure 7:
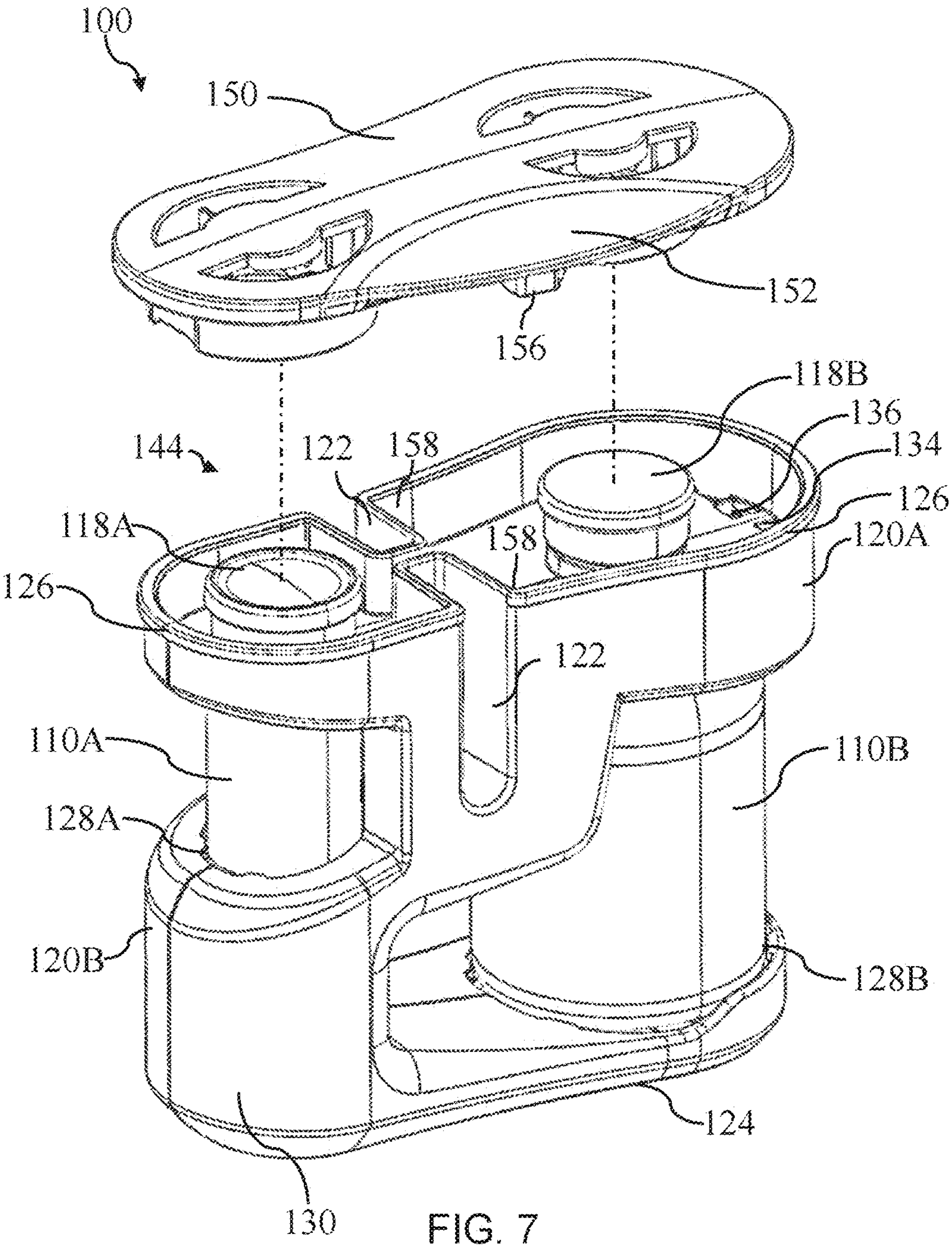
FIG. 7 depicts a partial exploded view of the container unit of FIG. 1 including a lid.

FIG. 7 depicts a partial exploded view of the container unit 100 of FIG. 1 including a lid 150. As shown in FIG. 7, the lid 150 is removed from the carrier formed by sections 120A, 120B. As discussed previously, the lid includes a tab 152 which facilitates removal of the lid. The container unit includes a first container 110A and a second container 110B disposed in the carrier, with openings of the first container and second container disposed proximate an interface portion 144 of the carrier. The lid may fit partially inside of the carrier to removably attach the lid to the carrier. The first container includes a first seal 118A and the second container includes a second seal 118B. According to the embodiment of FIG. 7, the lid engages the first seal and the second seal. As the lid is removed from the carrier, the seals may also be removed by the lid. According to the embodiment of FIG. 7, the seals may be more easily removed by lifting the tab. That is, without wishing to be bound by theory, the lid may function as a class two lever with the seals functions as a load and the carrier function as a fulcrum.

Figure 8:
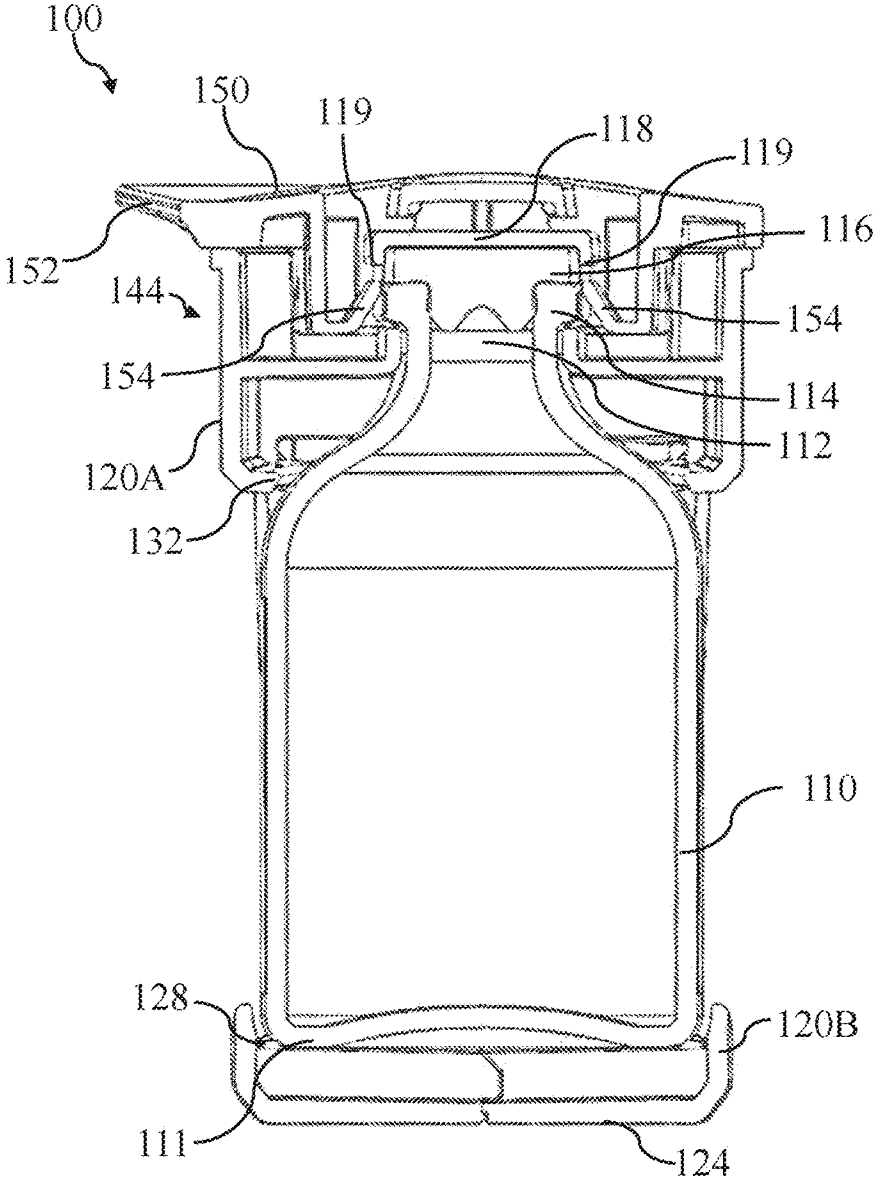
FIG. 8 depicts a cross-sectional view of the container unit of FIG. 1 taken along line 8-8 of FIG. 2.
Figure 9:
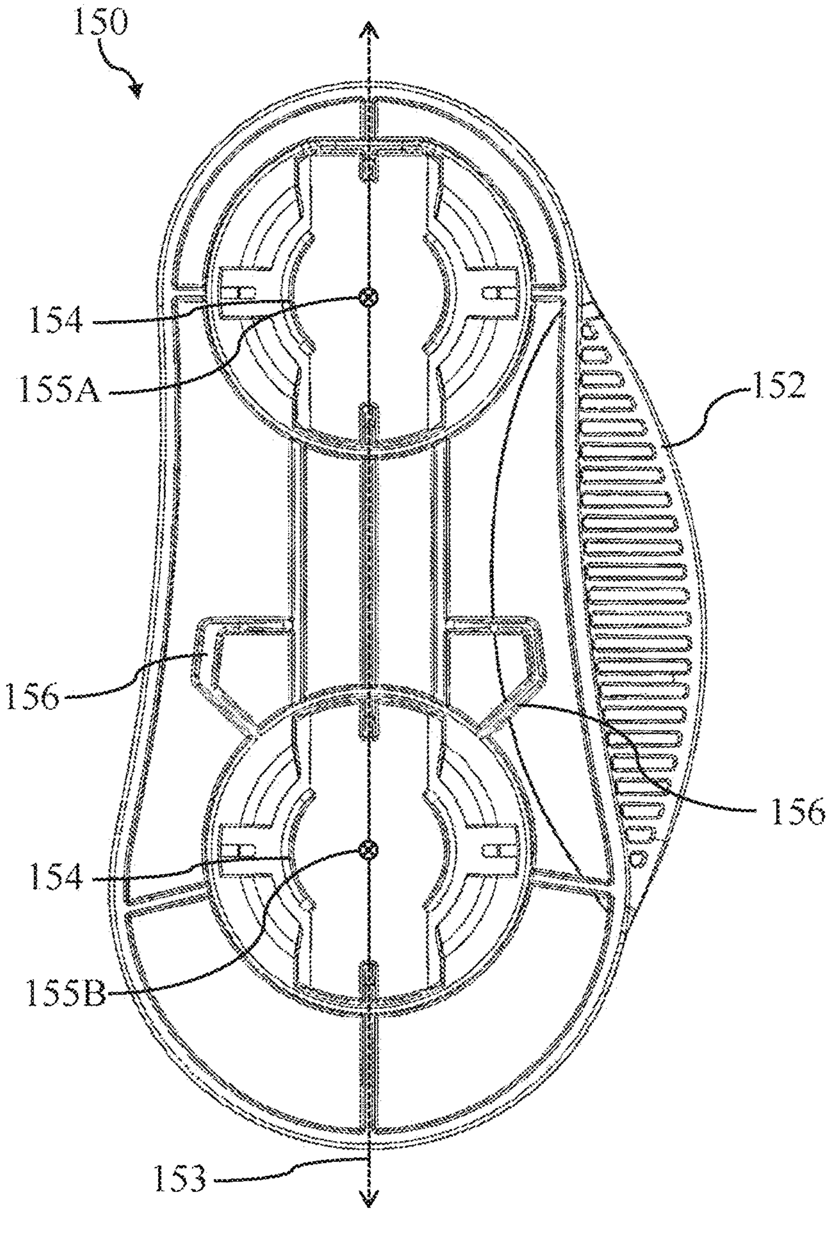
FIG. 9 depicts a bottom view of the lid of FIG. 7.

According to the embodiment of FIGS. 7-9, the lid 150 may engage the seals 118A, 118B to simplify their removal during an administration process. For example, the container engaging fingers 154 (see FIG. 8) may be configured to engage a downward facing lip of the top seal such that the lid may be used to apply upward force to the seals. As an alternative example, adhesives or other suitable fasteners may be used to physically couple the lid and the seals so that they remain substantially stationary relative to one another. As shown in the embodiment of FIG. 7, the lid includes a tab 152 which may be used to apply force to the seals. In some embodiments, the tab may include a hinged portion that may extend to provide additional leverage to a patient or medical professional removing the lid. According to the embodiment shown in FIGS. 7 and 9, the lid also includes rotation inhibitors 156 which prevent the lid from being rotated about either of the seals 118A, 118B prior to full removal of the lid. That is, the rotation inhibitors contact an interior wall 158 of the interface portion 144 of the carrier to inhibit rotation about axes extending from either seal in a direction away from the containers 110A, 110B. Such an arrangement may allow the lid to be rotated about a longitudinal axis and/or lifted in a direction along the axes extending form either seal in a direction away from the containers, such as when the lid is lifted by the tab 152. Of course, any suitable arrangement of lid and seals may be employed, as the present disclosure is not so limited.

FIG. 8 depicts a cross-sectional view of the container unit 100 of FIG. 1 taken along line 8-8 of FIG. 2. As shown in FIG. 8, the container unit includes a container 110 disposed in a carrier formed by sections 120A, 120B. The container 110 includes an opening 112 to an internal volume in which is disposed a stopper 116. A seal 118 is wrapped around the stopper as well as a container lip 114 of the container. A bottommost portion 111 of the container is held in the carrier inside of an indentation 128 and a container neck holder 132. The lid 150 is partially disposed inside of the carrier and includes a tab 152, and multiple container engaging fingers 154. The container engaging fingers 154 are disposed around and in contact with the seal 118. Accordingly, when the lid is removed (e.g., by lifting the tab), the container engaging fingers 154 will engage a downward facing lip of the seal 119 and apply a removing force to the seals. Thus, the seal 118 will be removed completely in conjunction with the lid 150.

In the embodiment of FIG. 8, the container engaging fingers 154 may be inclined towards the seal 118 and may be composed of a flexible material. Accordingly, when the lid 150 is placed over the container 110 and carrier 120, the container engaging fingers may deflect (i.e., flex) out of the way of the seal so that the lid may be removably secured to the carrier. Once the lid the secured, the container engaging fingers may be biased toward the seal so that the container engaging fingers remain in contact with the seal. Accordingly, when the lid is lifted the container engaging fingers do not flex out of the way of the seal, but rather engage the seal to apply a removing force. Such an arrangement may provide simplified manufacturing, and ensure that the seals are removed when the lid is removed with a simple motion. The lid may be composed of any suitable flexible material, including, but not limited to, plastics and metals. Of course, the lid may employ any suitable arrangement that covers and protects an opening of a container, as the present disclosure is not so limited.

FIG. 9 depicts a bottom view of the lid 150 of the container unit of FIG. 7. As discussed previously, the lid includes a tab 152 which is configured to allow an operator to apply force to seals engaged by the lid. In particular, container engaging fingers 154 engage the seals of the containers to remove the seals when the lid is removed. In some cases, the lid may be composed of a flexible material, such that one side of the lid may be removed (with the same side's container seal correspondingly removed) without removing the seal engaged by the opposite side of the lid. For example, a first portion of the lid may be pulled up along axis 155A to remove a first seal and then rotated about axis 155B, while a second portion of the lid remains engaged with a second seal, and the second seal remains in the opening 112B. As shown in FIG. 9, the lid includes one or more rotation inhibitors 156. The rotation inhibitors are configured to engage one or more components of the carrier (for example, see interior wall 158 in FIG. 7) to prevent rotation of the lid about either one of axis 155A or axis 155B when the corresponding portion of the lid is lifted and spaced from the carrier, so that an operator cannot access one container while maintaining the integrity of the seal on the other container. More specifically, the rotation inhibitors prevent lifting one side of the lid to remove a seal of a first container and rotating the lid about a seal of a second container to uncover the first container while maintaining the seal of the second container. According to the embodiment shown in FIG. 9, the rotation inhibitors inhibit rotation of the lid about either axis 155A or 155B without inhibiting movement of the lid in translation along said axes. The rotation inhibitors shown in FIG. 9 do not inhibit translations of the lid in a removal direction away from the carrier (i.e., in the direction of axes 155A, 155B into the page) or rotation of the lid about a longitudinal axis 153 of the lid or about any axis parallel to the longitudinal axis 153. Thus, an operator may use the tab 152 to remove the lid from the carrier by translating the lid and/or rotating the lid about the longitudinal axis or about any axis parallel to the longitudinal axis 153 to remove both seals without interference from the rotation inhibitors.

As shown in FIG. 9, the rotation inhibitors 156 are configured as two walls which are shaped to complement and closely fit with the shape of an interior wall (for example, see interior wall 158 in FIG. 7) so that rotation about axes 155A, 155B is inhibited. When the lid is rotated about either axis 155A or 155B, at least one of the rotation inhibitors contacts a portion of the carrier to prevent further rotation. That is, the rotational arc traced by the rotation inhibitors about either axis 155A or 155B overlaps with a portion of the carrier, such that the rotation inhibitors interfere with the carrier when the lid is rotated about either axis. However, the rotational arc and/or translational path of the rotation inhibitors when moved in other directions (e.g., rotation about longitudinal axis 153, axes parallel to axis 153, or translations along axes 155A, 155B) may not overlap with the carrier in those directions, so that no interference occurs and the lid is free to move in those directions. In some cases, a close fit between the rotation inhibitors and the carrier may improve the inhibition of rotation about axis 155A or 155B by reducing the rotational clearance in those directions. Of course, while the rotation inhibitors shown in FIG. 9 are configured as two walls which closely fit the interior wall of the carrier, the rotation inhibitors may be configured as any suitable structure which impedes rotation of the lid. In some embodiments, the rotation inhibitors may be disposed between the two container engaging fingers proximate the geometric center of the lid. Such an arrangement may ensure rotation is suitably inhibited if either side of the lid is lifted by ensuring the rotational arc of the rotation inhibitors is larger than the rotational clearance of the carrier in rotational directions about axis 155A or axis 155B. In some embodiments, the rotation inhibitors may be disposed outside of the interior wall of the container and may be configured to engage an exterior wall of the carrier to inhibit rotation of the lid.

Figure 10:
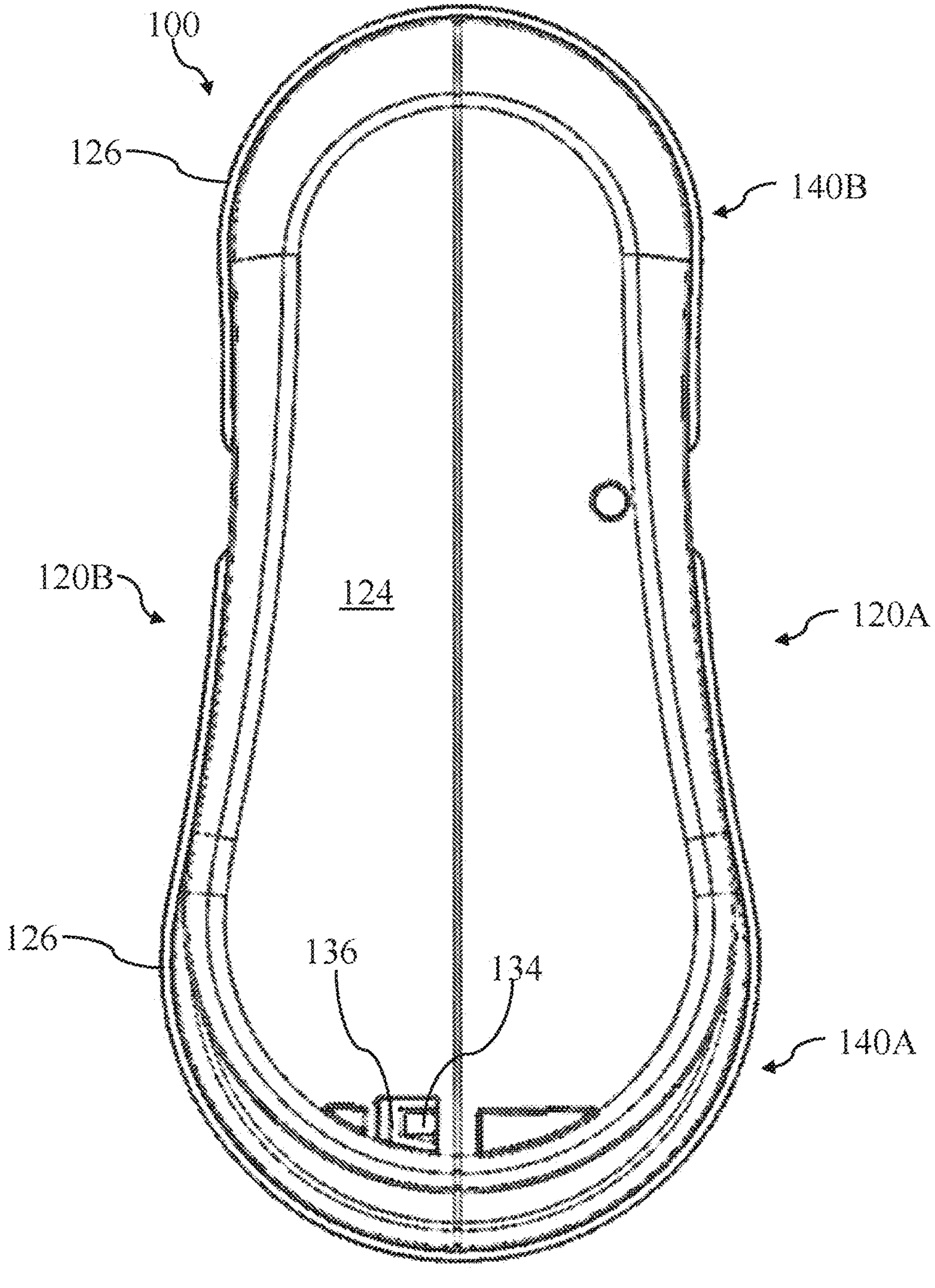
FIG. 10 depicts a bottom view of the container unit of FIG. 1.

FIG. 10 depicts a bottom view of the container unit 100 of FIG. 1. As shown in FIG. 10, the container unit includes a carrier formed of a first section 120A and a second section 120B. The carrier includes a bottom 124 which is substantially continuous and extends in a plane. According to the embodiment of FIG. 10, the bottom covers bottommost portions (for example, see FIG. 3 and FIG. 8) of containers held within the carrier. The bottom also spans any lateral (i.e., transverse) gaps or spaces between the bottommost surfaces of the containers in the carrier. Thus, the bottom may provide a surface to which a force may be applied. According to the embodiment of FIG. 10, the container unit may be configured to connect with a pooling device along a top portion of the container unit. In some embodiments, force may be used to engage the container unit with one or more latches of the pooling device as well as pierce the containers of the container unit with one or more spike assemblies. Therefore, it may be desirable to provide a smooth surface on the container unit which may be used to apply even force to the carrier and each of the containers disposed therein. In some embodiments, the bottom surface may at least partially cover a bottommost portion of each of the containers disposed in the carrier. According to this embodiment, a portion of the carrier which may be used to apply force to each of the bottommost portions of the container may be suitable for connecting the container unit to a pooling device. In some embodiments, the bottom 124 of the container unit may be substantially flat. Such an arrangement may be desirable in cases where the container unit may be set upright on a flat surface. For example, a flat bottom may be desirable for a container unit to be set upright on a table top. A flat arrangement of the bottom may also facilitate force application to the container unit. Of course, the bottom of the container unit may employ any suitable arrangement with an appropriate shape, as the present disclosure is not so limited.

Figure 11:
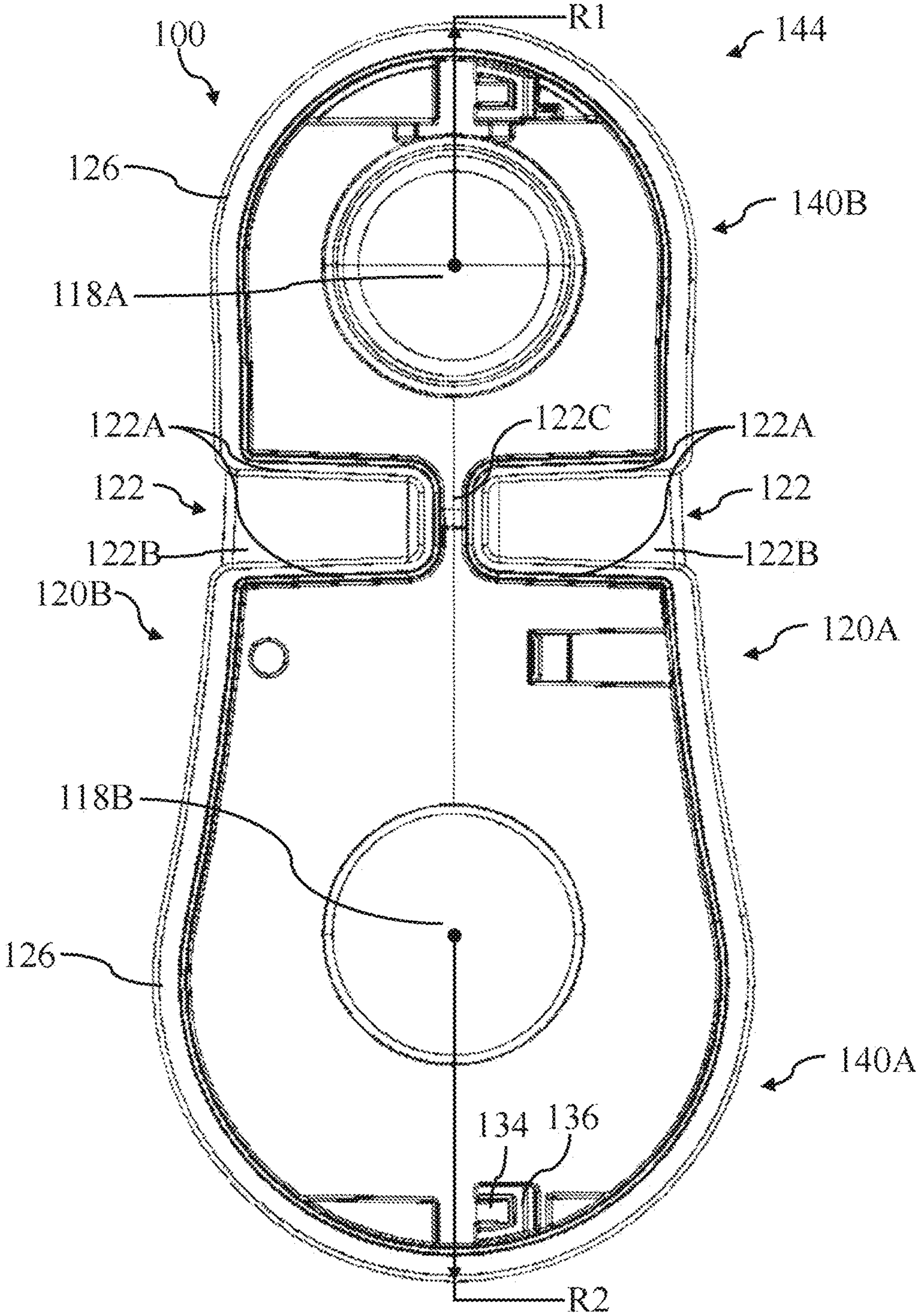
FIG. 11 depicts a top view of the container unit of FIG. 1 with the lid removed.

FIG. 11 depicts a top view of the container unit 100 of FIG. 1 with the lid 150 removed revealing interface portion 144. As shown in FIG. 11, the seals 118A, 118B are disposed over a stopper and opening of a first container and a second container. The containers are disposed in a carrier formed of a first section 120A and a second section 120B and having an interface portion 144. The interface portion includes a slot 122 disposed between the first container and the second container. As discussed previously, the slot includes side walls 122A, curved wall 122B, and interior wall 122C. The interior wall 122C divides the slot into two portions, each with equally sized side walls and curved walls. As shown in FIG. 11, each portion of the slot forms at least three walls of a rectangular prism. As discussed previously, a pooling device or other medical device may have an insert with a shape complementary to that of the slot. The insert may include projections split by a channel configured to receive the interior wall 122C of the slot. Accordingly, as the container unit is coupled to the pooling device or other medical device, the slot may guide and orient the container unit to a correct position.

As shown in FIG. 11, the interface portion 144 of the carrier formed by sections 120A, 120B includes a first outer circumferential surface 140A with a first shape and a second outer circumferential surface 140B with a second shape. The first outer circumferential surface 140A is disposed around the first container and first seal 118A while the second outer circumferential surface 140B is disposed around the second container and the second seal 118B. The first surface and second surface are separated by the slot 122. According to the embodiment shown in FIG. 11, the first shape and second shape are each substantially ellipsoidal with different radii. That is, the first shape has a radius R1 extending from the center of the first container that is less than the radius R2 extending from the center of the second container. Of course, the first shape and the second shape may be any suitable shape, including triangular, rectangular, polygonal, circular, or any combination thereof, as the present disclosure is not so limited. In some embodiments, the first shape and second shape may correspond to a shape of a port on an associated pooling device or other medical device. That is, in some embodiments, the first shape and second shape combined may be approximately the same a shape of a port on the pooling device. The combined shape may be asymmetrical due to the differences between the first shape and the second shape.

It should be appreciated, however, that the container unit may be used with pooling devices having differently shaped ports, and are not limited to use with pooling device ports that have approximately the same shape as the container unit. For example, the container unit may be used with pooling devices having rectangular shaped ports, square shaped ports, oval shaped ports, or any other suitable shape.

Figure 12:
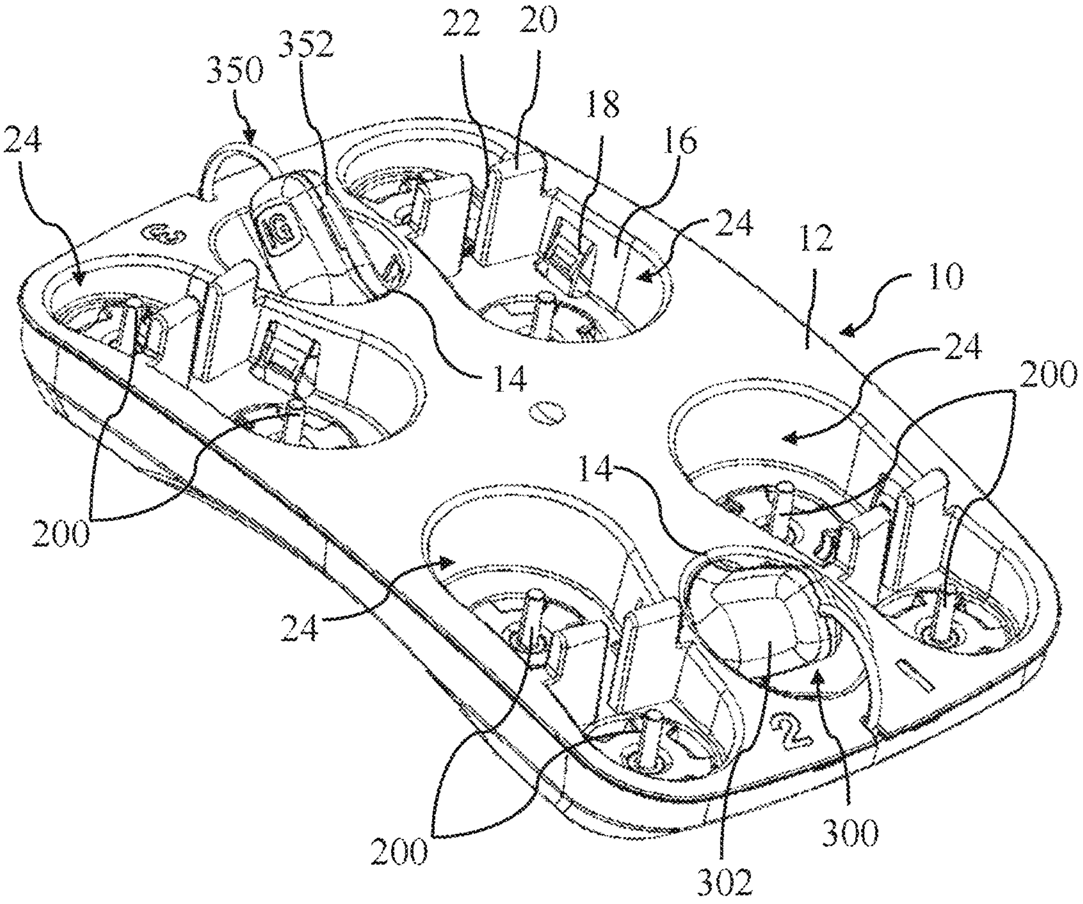
FIG. 12 depicts an embodiment of a pooling device.
Figure 13:
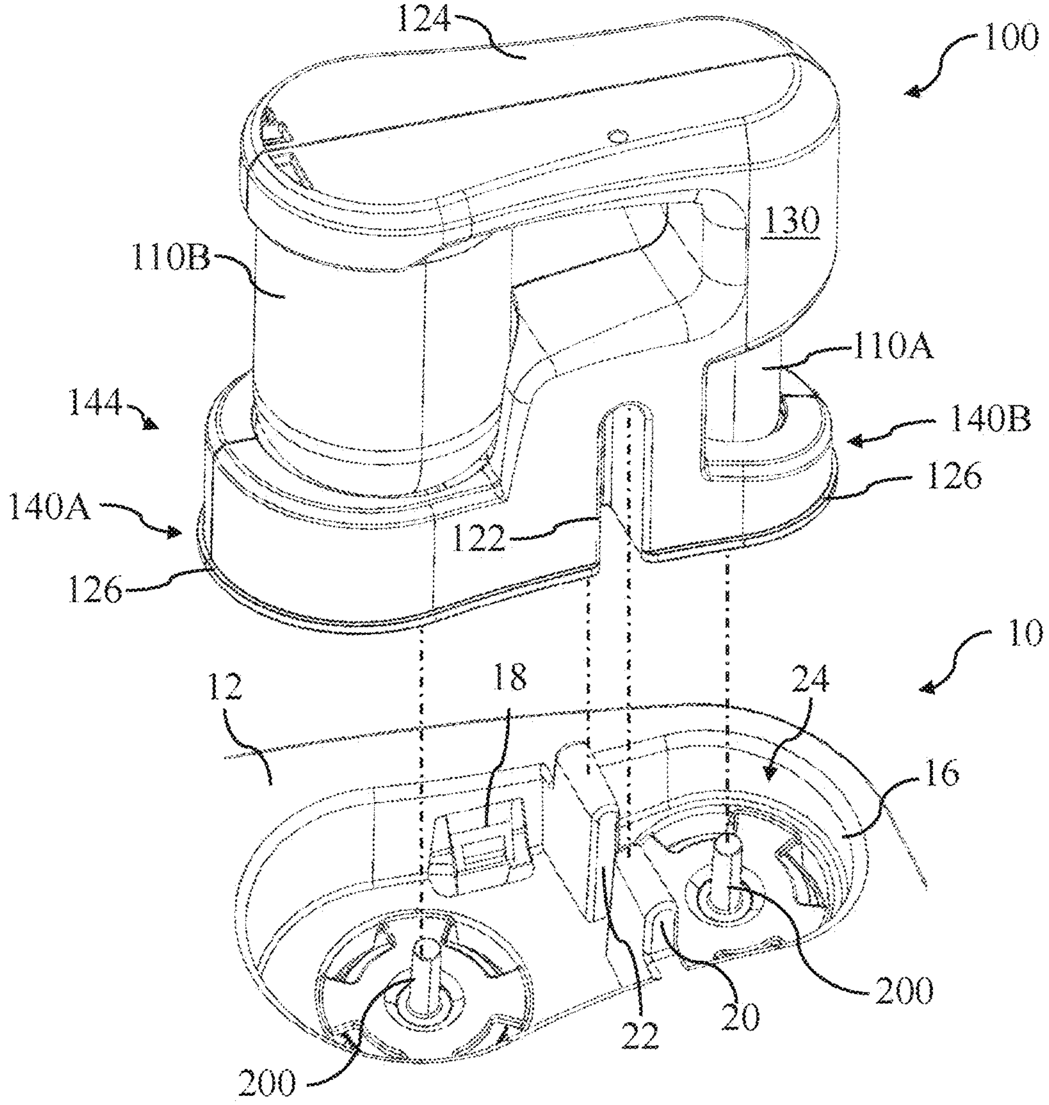
FIG. 13 depicts an exploded view of the container unit of FIG. 1 in use with the pooling device of FIG. 12.

It should also be appreciated that different container unit shapes may be used with the pooling device shown in FIGS. 12 and 13. In some embodiments, the shape of the container unit does not match the shape of the pooling device port. For example, the outer circumferential surfaces may form a symmetrical oval or a rectangle. In some embodiments, the container unit shape merely needs to be smaller than the shape of the port of the pooling device to be received by the port.

In some embodiments, the pooling device used with the container unit is a pooling bag. A hollow spike may be used to pierce the container unit and bring the container unit in fluid communication with the pooling bag. In some embodiments, fluid can be drawn out of the container units into a syringe, in which case the needle of the syringe would pierce into the container units.

FIG. 12 depicts one embodiment of a medicinal pooling device 10. The medicinal pooling device includes a housing 12, a first fluid distribution system 300, a second fluid distribution system 350, and four ports 24 for receiving a container unit. In the embodiment depicted in FIG. 12, the medicinal pooling device is configured to supply two medicinal fluids that may be pooled from up to four containers for each fluid. The first medicinal fluid may be packaged with the second medicinal fluid (i.e., each of four container units may include two containers), such that each port may receive both medicinal fluids simultaneously. According to the present embodiment, the medicinal fluids are not mixed, but rather are supplied independently to fluidic interfaces 302, 352, which may connect to a fluid administration device such as a syringe or an infusion pump that may deliver the fluids sequentially to a patient. The first and second medicinal fluids may be carried by separate tubing to each of the fluidic interfaces, respectively. As shown in FIG. 12, the fluidic interfaces may be removably connected to interface holders 14 for storage and transportation.

As shown in FIG. 12, each of the four ports 24 of the medicinal pooling device is exposed. Each port includes a recess 16 configured to receive a container unit having containers of medicinal fluid for pooling and/or administration to a patient. As shown in FIG. 12, each port includes two spike assemblies 200. In each port, one spike assembly is connected to a first fluid distribution system and one spike assembly is fluidly connected to a second fluid distribution system. Accordingly, each port accommodates multiple containers of separate medicinal fluids for pooling and administration. In the embodiment shown in FIG. 12, when the container units are inserted into the ports, the containers disposed in the container unit may be pierced by the spike assemblies 200 to fluidly connect each of the containers to one of the fluid distribution systems terminating in the fluidic interfaces 302, 352.

As shown in FIG. 12, each port 24 may include components configured to align inserted container units, or otherwise simplify the medicinal administration process. For example, the ports may include a recess 16 formed in the housing 12 of the medicinal pooling device, allowing a container unit to be guided by the port as the container unit is pushed onto spike assembly 200 by a patient or medical professional. That is, a container unit with an outer circumferential surface shape complementary to that of the perimeter of the port may be aligned and guided by the perimeter of the port as each container of the container unit is pressed onto a spike assembly. The port may also include an insert 20 and a guide channel 22 configured to provide additional guiding and aligning surfaces for insertion of the medicinal fluid containers. The insert 20 and the guide channel 22 may have a shape complementary to the shape of a slot and an interior wall of a container unit. Accordingly, the guide projection and guide slot may contact the slot and/or interior wall to guide and align the individual containers disposed in the container unit with the spike assemblies 200. In the embodiment shown in FIG. 12, the port includes at least one latch 18 configured to removably or permanently couple any received container unit to the port to inhibit removal. In some embodiments, the latches may be configured to removably couple with the container unit. The ports may include any suitable alignment features or locking features, as the present disclosure is not so limited.

In some cases, it may be desirable to maintain the sterility of the container unit and/or the medicinal pooling device by inhibiting subsequent uses of the container unit. Accordingly, in some embodiments, a container unit and/or pooling device may be configured for single use as a disposable device. That is, the container unit and/or pooling device may be configured to discourage or prevent reuse of the medicinal pooling device. For example, as shown in FIG. 12, the latch 18 of the medicinal pooling device 10 may be configured to substantially prevent removal of a container unit attached to a port 24. Thus, an operator (e.g., patient or medical professional) may not be able to replace a container unit to begin a second administration process. It should be appreciated that any other suitable components may be used to inhibit multiple uses of the container unit and/or pooling device, including mechanical lockouts and self-closing valves.

FIG. 13 depicts an exploded view of the container unit 100 of FIG. 1 in use with the pooling device 10 of FIG. 12. As shown in FIG. 13, the container unit is inverted such that the bottom 124 is above the interface portion 144 including lip 126, with the bottom 124 of the container unit facing away from the port 24 of the pooling device. With the container unit in the inverted position, the openings (not shown in the figure) and stoppers of the first container 110A and second container 110B are facing the spike assemblies 200. The lid of the container unit and the seals of the containers have been removed so that the container unit is ready for connection to the pooling device. As shown in FIG. 13, the interface portion 144 includes a slot 122 aligned with the insert 20 and guide channel 22 of the port. The slot has a shape complementary to that of the insert and guide channel, so that, in the position shown, the container unit may be connected to the port. If the container unit was not in the appropriate orientation shown, the insert may contact the container unit and resist connection of the container unit to the port. In a similar manner to the insert and slot described above, the first outer circumferential surface 140A and second outer circumferential surface 140B of the container unit interface portion are aligned with the recess 16 of the pooling device. The recess 16 has a shape complementary to that of the first outer circumferential surface 140A and second outer circumferential surface 140B, so that the container unit may be appropriately guided and oriented as the container unit is connected to the port. If the container unit is not suitably oriented and aligned with the recess, the housing 12 of the pooling device may contact the container unit and resist connection to the port.

As shown in FIG. 13, the lip 126 of the container unit 100 may be configured to engage latch 18 disposed in the port 24 of the pooling device. The latch 18 may include a barbed end configured to deflect as the lip passes the barbed end, whereupon the barbed end may return to an original position to engage the lip. Such an arrangement may allow the container unit to be fully inserted into the recess 16 while providing resistance to removal of the container unit. The latch is not limited to a barbed end, however, and may use any suitable arrangement to secure the container unit to the pooling device. According to the embodiments of FIG. 13, the port includes two latches disposed on opposite side of the recess 16. In other embodiments, the port may include a single latch or more than two latches to secure the container unit as the present disclosure is not so limited.

Figure 14:
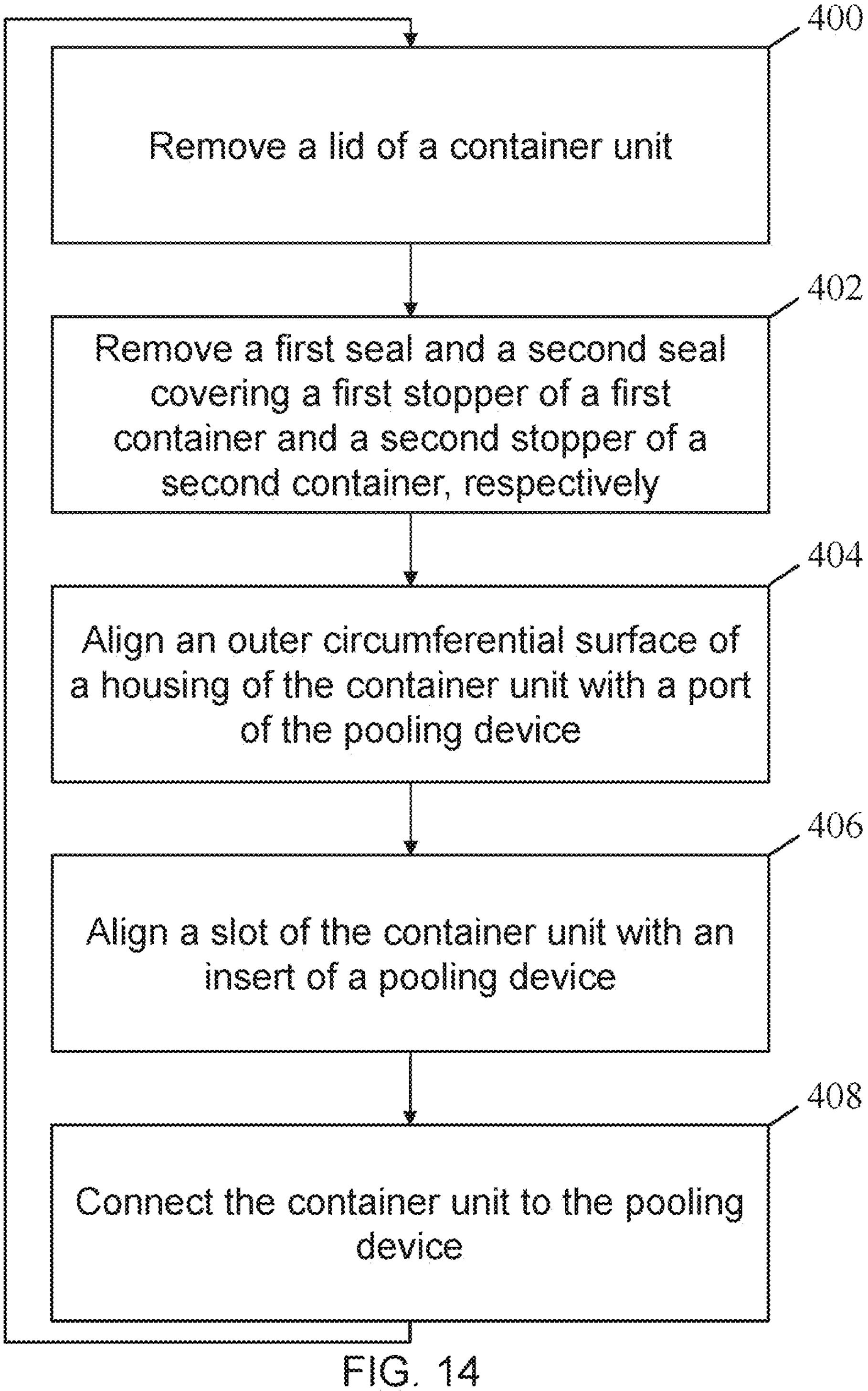
FIG. 14 is a block diagram of one embodiment of a method for using a container unit with a pooling device.

FIG. 14 is a block diagram of one embodiment of a method for using a container unit with a pooling device. In block 400, a patient or medical professional may remove a lid of a container unit to expose a first container and a second container of medicinal fluid. In block 402, the patient or medical professional may remove a first seal and a second seal covering a first stopper of the first container and a second stopper of a second container, respectively. In some embodiments, blocks 400 and 402 may be combined into a single step. For example, the lid may be coupled to the first seal and second seal so that removal of the lid also removes the first seal and second seal from the containers. In block 404, the patient or medical professional may align an outer circumferential surface of a carrier of the container unit with a port of the pooling device. In block 406, the patient or medical professional may align a slot of the container unit with an insert of a pooling device. In some embodiments, the order of the steps in blocks 404 and 406 may be reversed depending on the particular geometry of the container unit and the pooling device. In block 408, the patient or medical professional may connect the container unit to the pooling device at the port. Blocks 400-408 may be repeated as many times as necessary to reach a particular dosage of medicinal fluid connected to the pooling device. That is, for an increased dosage, additional container units may be connected to a pooling device.

Figure 15:
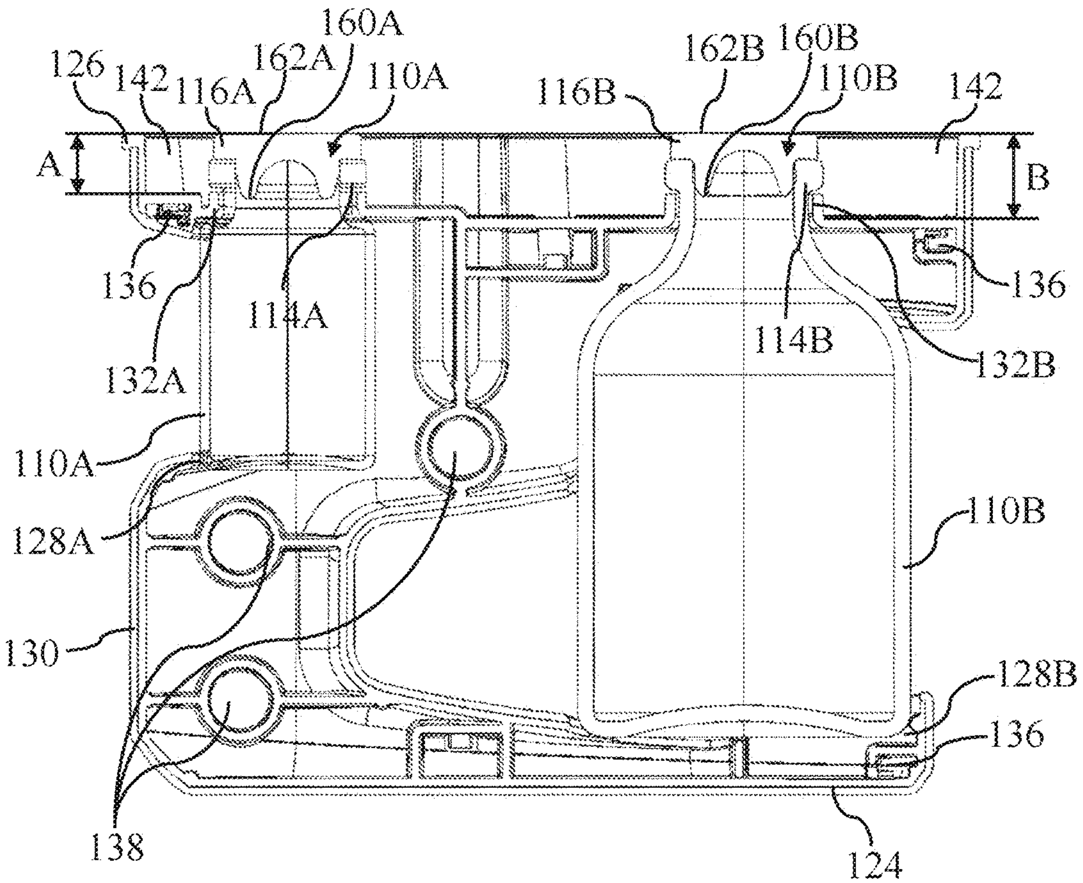
FIG. 15 is a cross-sectional view of the container unit of FIG. 1 taken along line 15-15 of FIG. 1.

FIG. 15 is a cross-sectional view of the container unit 100 of FIG. 1 taken along line 15-15 of FIG. 1. As shown in FIG. 15 and discussed previously, the carrier 120 of the container unit holds the first container 110A and the second container 110B with indentations 128A, 128B and container neck holders 132A, 132B. The first container includes a first stopper 116A disposed in a first opening 110A, the opening 110A being defined by a first plane. The second container includes a second stopper 116B disposed in a second opening 110B, the opening 110B being defined by a second plane. According to the embodiment shown in FIG. 15, the first plane and second plane are coplanar (i.e., the first opening and second opening are disposed on a common level). As shown in FIG. 15, the lid of the container unit as well as the seals of the containers has been removed. An extension 142 forms an uppermost portion of the carrier extending in a direction away from the internal volumes of the containers. Each of the stoppers includes a first end 160A, 160B and a second end 162A, 162B, where the second end faces away from the internal volume of the container the stopper is disposed in. According to the embodiment shown in FIG. 15, the extension 142 extends away from the internal volume of the first container 110A to a level at least even with the second end 162A of the first stopper 116A. That is, an offset between the extension and the second end of the first stopper is greater than or equal to zero. In the embodiment shown in FIG. 15, the extension extends a distance A away from the container neck holder 132A. The extension may be configured to contact a pooling device when the container unit is connected to the pooling device. The extension may resist forces applied to the bottom 124 of the carrier, so that any spike or needle of the pooling device does not extend further into the first container. Accordingly, the extension may set a predetermined penetration depth of any spike or needle that may extend into the first container. Such an arrangement may promote suitable drainage of the first container via a spike or other coupler. For example, if a spike was over-inserted into the container, the medicinal fluid disposed therein may not be able to be fully extracted via the spike. According to this example, it may be desirable to have any internal channels of a spike disposed adjacent or near the first end of the first stopper, so that the medicinal fluid may be fully extracted (i.e., drained) from the first container.

As can be recognized from FIG. 15, the second ends 162A, 162B of the first stopper 116A and second stopper 116B of the containers 110A, 110B are disposed on a common level. That is, second ends of the stoppers are disposed in a common plane that is disposed at a distance from the bottom 124 of the carrier 120 (i.e., at a common distance in the vertical dimension). This is the case despite the size difference of the containers 110A, 110B in the vertical dimension according to the embodiment shown in FIG. 15. As shown in FIG. 15, the extension 142 extends away from the container neck holder 132B a distance B which is greater than distance A to compensate for the container size differences and the position of the container neck holders 132A, 132B. As a result, the extension 142 of the carrier may extend away from an internal volume of the second container 110B to a level at least even with the second end 162B of the second stopper 116B. That is, the extension 142 of the carrier may be offset from the second end of the second stopper in a direction outward from the second end by a distance which may be greater than or equal to zero. As a further result, the features of the containers, such as the seals (not shown in the figure), may also be disposed on a common level. Arrangement of the second ends of the seals at a common level may simplify the construction of and facilitate the use of a lid, as well as potentially facilitate administration of fluid disposed in the containers. Of course, the second ends of the stoppers (or other features) may disposed on different levels, as the present disclosure is not so limited.

According to the embodiment shown in FIG. 15, the extension 142 of the carrier forms at least a portion of the lip 126. Accordingly, in the embodiment of FIG. 15, the lip 126 forms at least a part an uppermost portion of the carrier. In other embodiments, the extension and the lip may be separate and independent from one another. For example, the extension may not extend from an outer circumferential surface, but may rather extend from a central region of the carrier. While the extension 142 of FIG. 15 extends around a substantial portion of the outer circumference of the carrier, the extension may have any suitable arrangement so that the extension is at least even with a second end 162A of the first stopper 116A. For example, the extension may be formed as posts, spacers, or any other suitable standoff configured to resist force that may over-insert a spike into the first container.

As shown in FIG. 15, an uppermost portion of extension 142 may have a constant offset relative to at least one of the second ends of the stoppers 116A, 116B. For example, the extension 142 may form multiple uppermost points or regions with are disposed in a common plane. Each of the multiple uppermost points or regions may have an equivalent offset from the second ends 162A, 162B of the stoppers in a direction away from the internal volumes of the containers 110A, 110B. That is, the extension may form a flat uppermost portion such that a predetermined penetration depth may be set for at least one of the stoppers at each of the multiple uppermost points or regions of the carrier.

Figure 16:
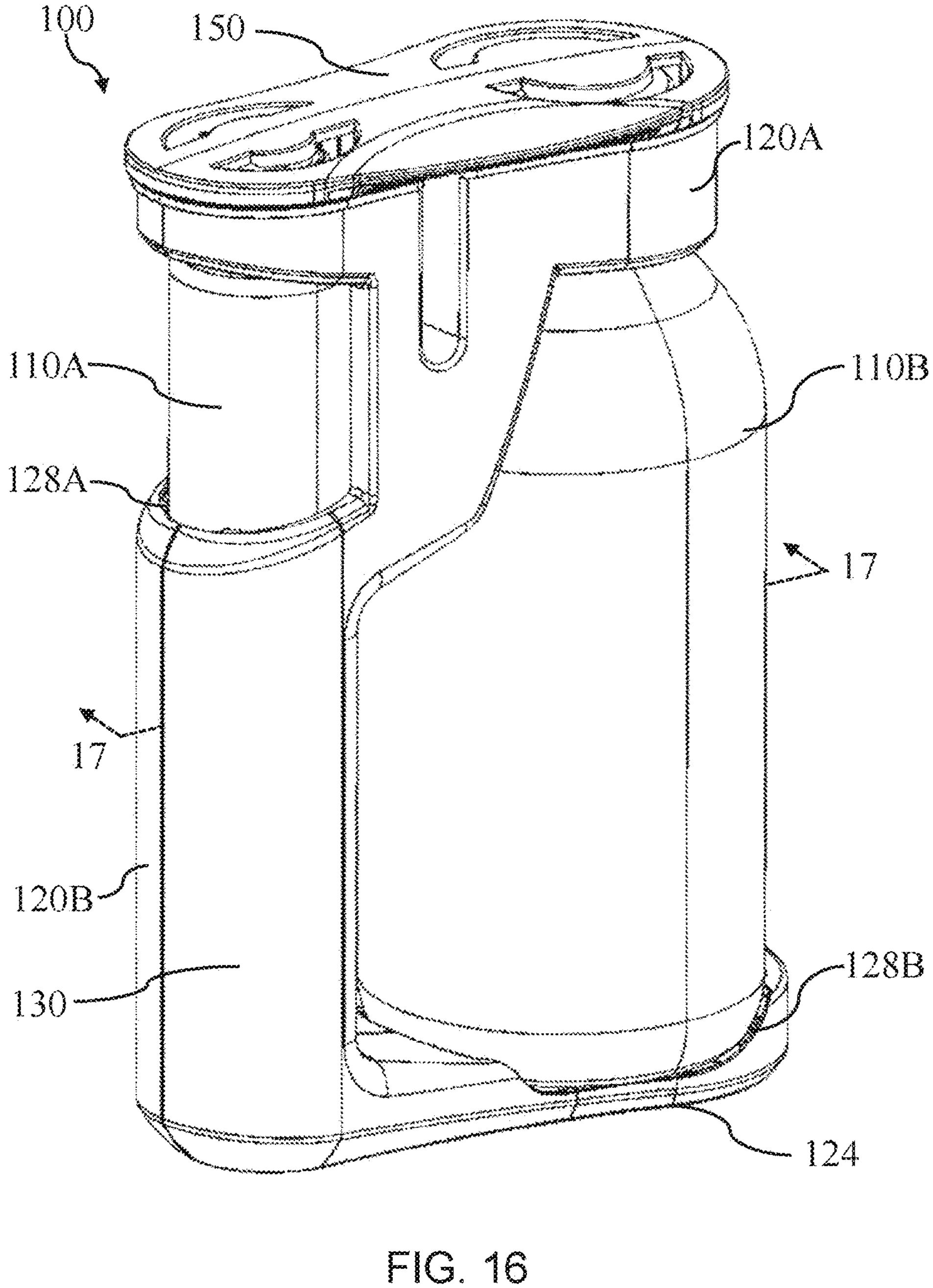
FIG. 16 depicts another embodiment of a container unit.

FIG. 16 depicts another embodiment of a container unit 100. Similar to the embodiment of FIG. 1, the container unit includes a first container 110A, a second container 110B, and a carrier formed of a first section 120A and a second section 120B. The container unit also includes a lid 150 which covers openings of the first and second containers. In contrast to the embodiment of FIG. 1, the container unit of FIG. 16 has radially and longitudinally larger second container 110B with a correspondingly altered second indentation 128B. Where the second indentation of FIG. 1 formed a complete circle, the second indentation 128B of FIG. 16 is cut into two partial arcs of a circle. Accordingly, the bottom 124 may only partially cover a bottommost portion of the second container 110B.

Figure 17:
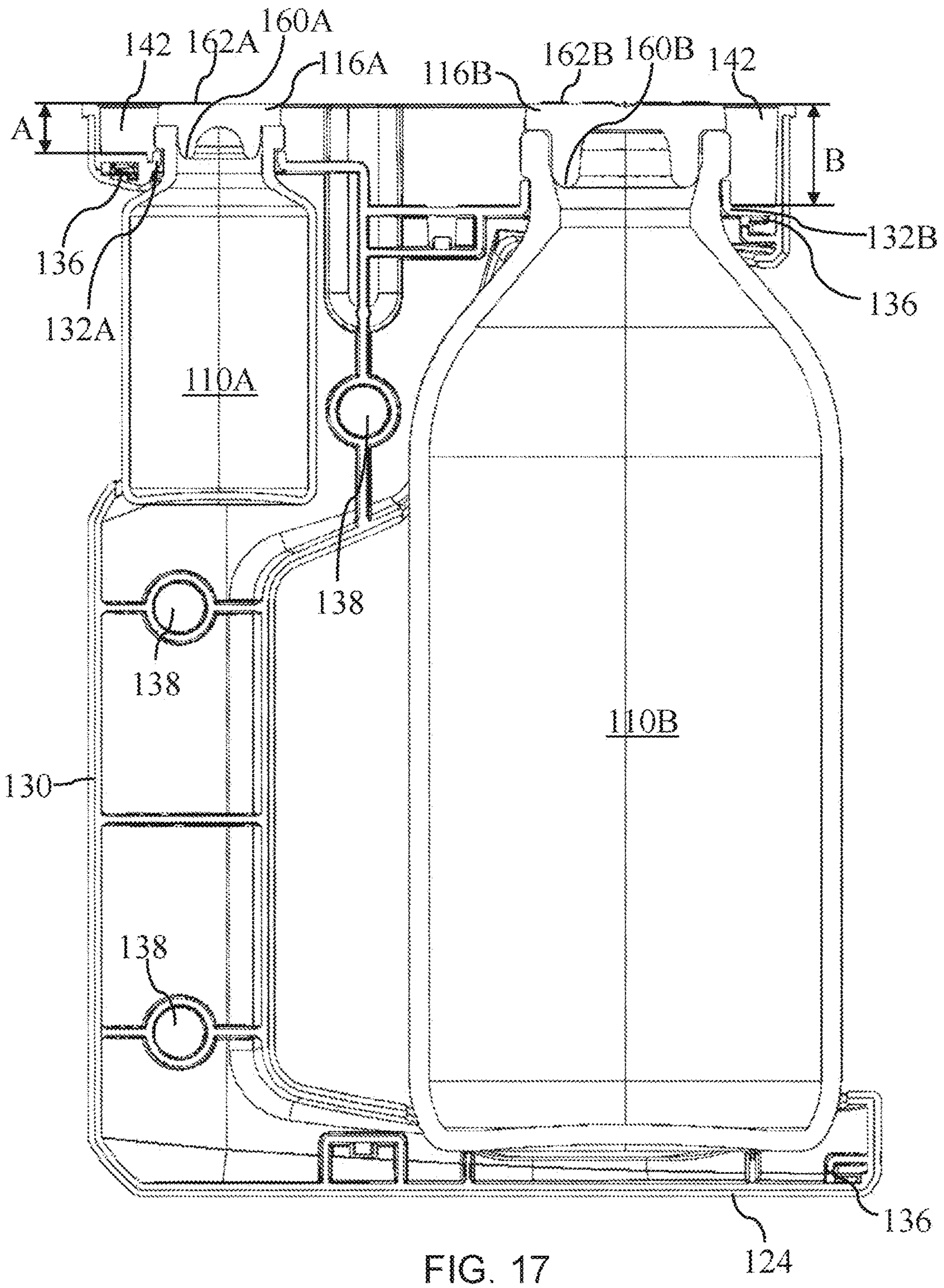
FIG. 17 depicts a cross-sectional view of the container unit of FIG. 16 taken along line 17-17 of FIG. 16.

FIG. 17 depicts a cross-sectional view of the container unit 100 of FIG. 16 taken along line 17-17 of FIG. 16. Similar to the embodiment shown in FIG. 15, the second end 162A of the first stopper 116A is aligned vertically with an extension 142 of the carrier. That is, the extension extends from a container neck holder 132A by a distance A which results in an offset between the extension and the second end of the first stopper being approximately zero. Similarly, the second end 162B of the second stopper 116B extends to a level approximately level with the extension 142. The extension 142 extends from a second container neck holder 132B by a distance B which leaves the extension approximately level with the second end of the second stopper. Accordingly, in the embodiment shown in FIG. 17, the offset distance is approximately zero, as the second end of the second stopper is aligned with the extension 142 of the carrier. Accordingly, the second ends of the first stopper and the second stopper are disposed in a common plane.

Figure 18:
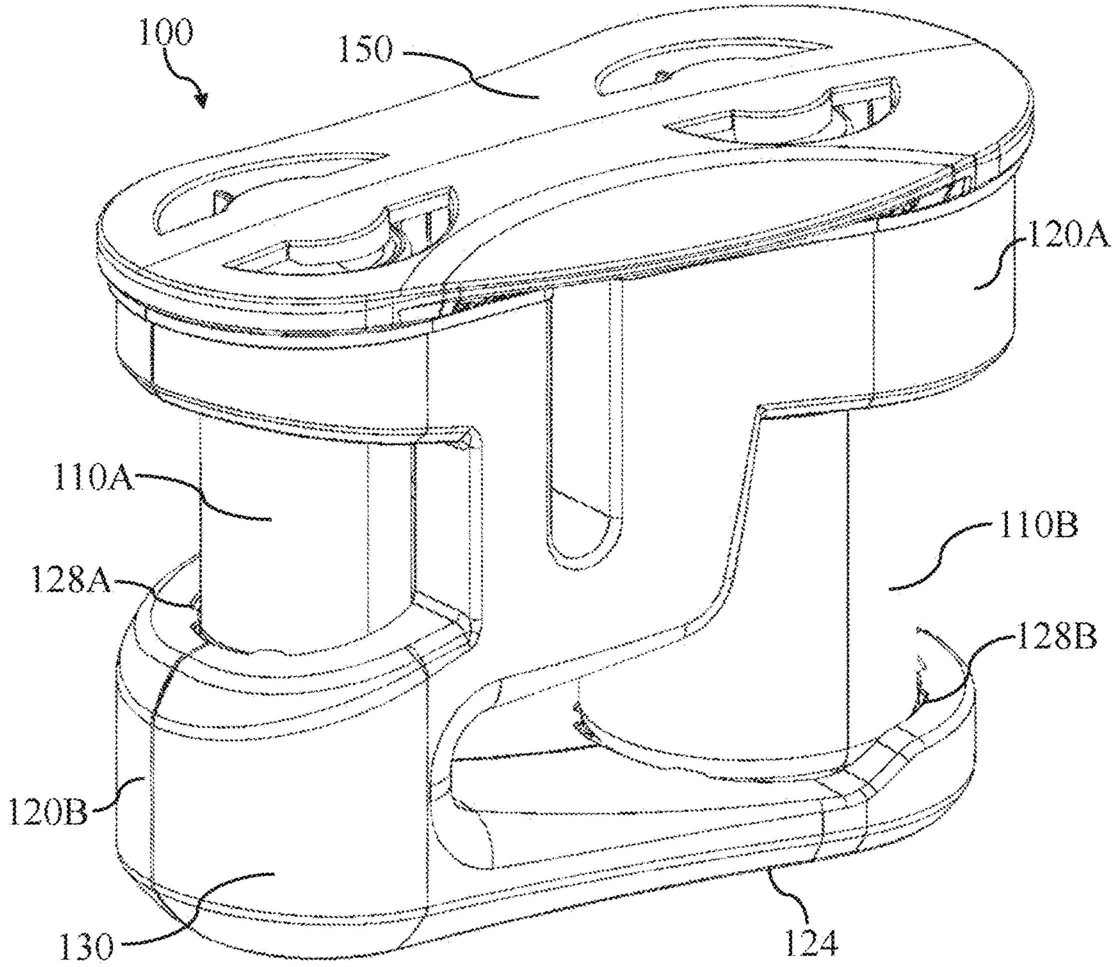
FIG. 18 depicts yet another embodiment of a container unit.

FIG. 18 depicts yet another embodiment of a container unit 100. Similar to the embodiment of FIG. 1, the container unit includes a first container 110A, a second container 110B, and a carrier formed of a first section 120A and a second section 120B. The container unit also includes a lid 150 which covers openings of the first and second containers. In contrast to the embodiment of FIG. 1, the second container 110B is radially and longitudinally smaller. As a result, the second indentation 128B is smaller while the bottom 124 is approximately the same size. Accordingly, the carrier is thicker around the second indentation.

Figure 19:
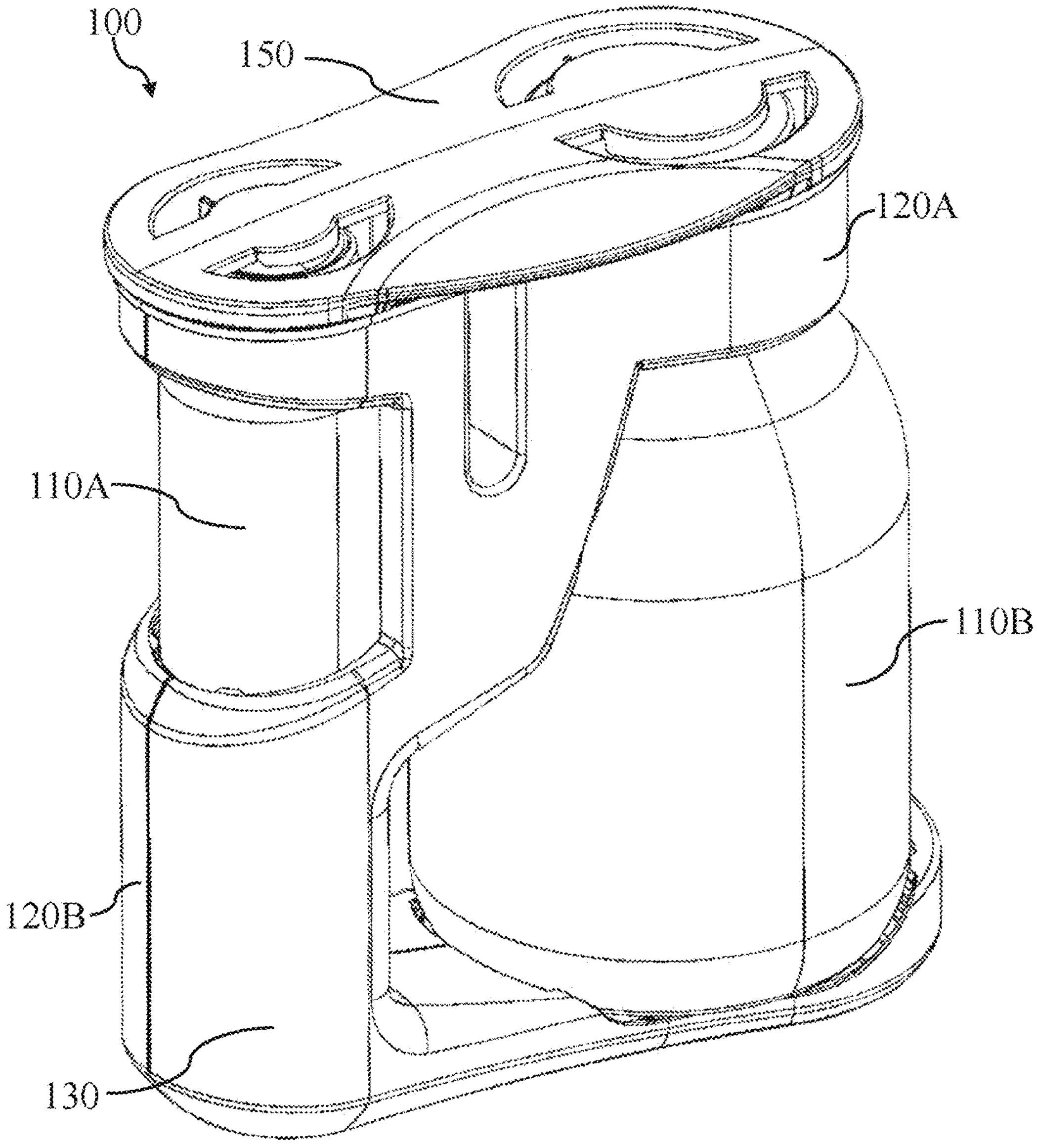
FIG. 19 depicts yet another embodiment of a container unit.

FIG. 19 depicts yet another embodiment of a container unit 100. Similar to the embodiment of FIGS. 1 and 16, the container unit includes a first container 110A, a second container 110B, and a carrier formed of a first section 120A and a second section 120B. The container unit also includes a lid 150 which covers openings of the first and second containers. In contrast to the embodiment of FIG. 16, the second container 110B is radially and longitudinally larger. As a result, the second indentation 128B is even larger than that of FIG. 16 and forms two separate arcs while the bottom 124 is approximately the same size. Accordingly, the carrier is thinner around the second indentation, which allows for a larger volume of medicinal fluid in the second container 110B.

Figure 20:
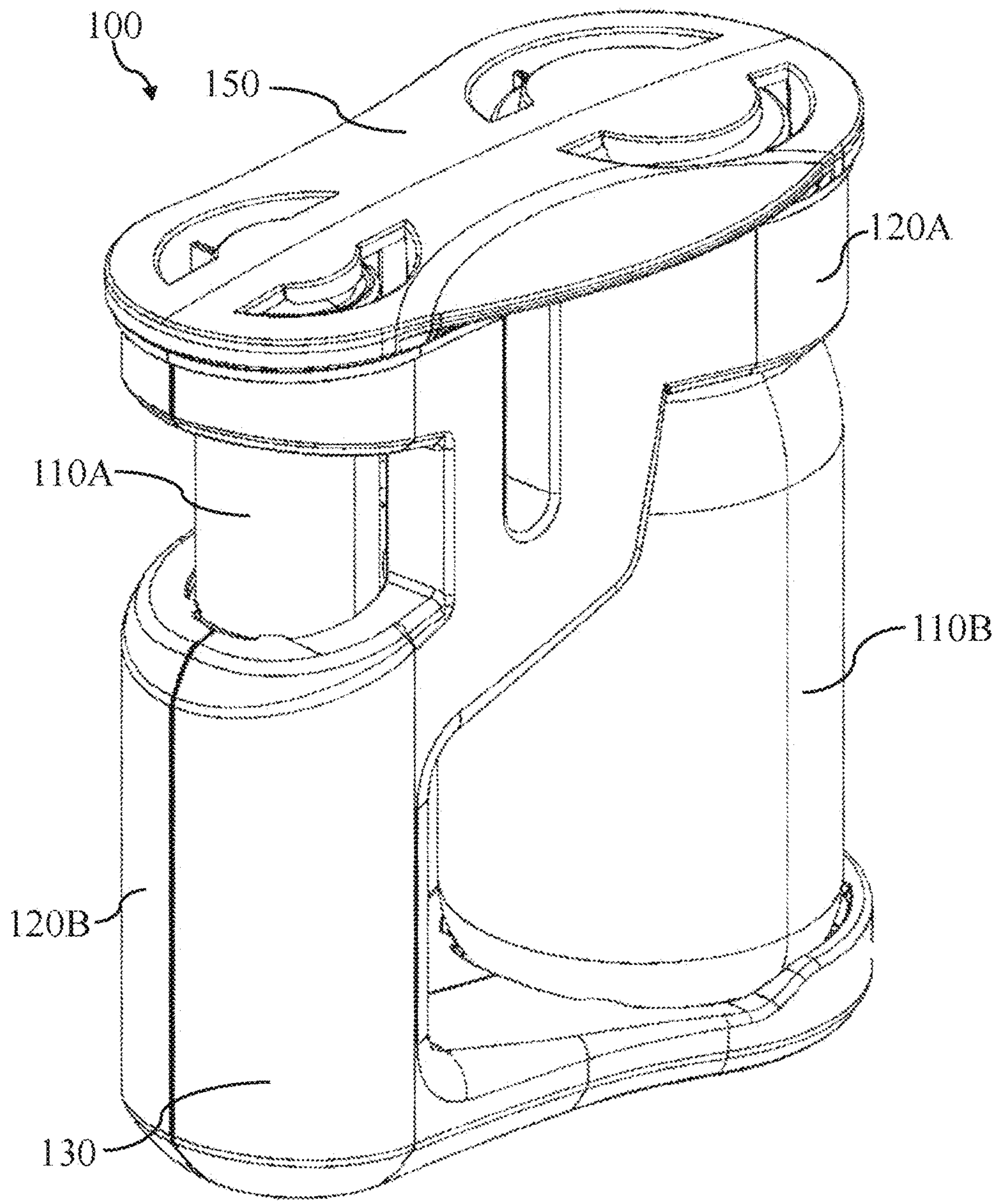
FIG. 20 depicts yet another embodiment of a container unit.

FIG. 20 depicts yet another embodiment of a container unit 100. Similar to the embodiment of FIG. 1, the container unit includes a first container 110A, a second container 110B, and a carrier formed of a first section 120A and a second section 120B. The container unit also includes a lid 150 which covers openings of the first and second containers. In contrast to the embodiment of FIG. 1, the second container 110B is longitudinally larger. As a result, the height of the container unit is large while the outer circumferential dimensions are approximately the same. Accordingly, the container unit of FIG. 20 may include more medicinal fluid for a given outer circumferential shape.

In some embodiments, first and second sections of a carrier may each be made, in whole or in part, of a clear (e.g., transparent, translucent) material that allows a user to view first and second containers through the first and second sections. In one example, the first and second sections may each be made of a plastic resin, such as copolyester, which combines high clarity with acceptable mechanical properties. Of course, other materials may also be used that allow the first and second containers to be viewed through the first and second sections.

Figure 21:
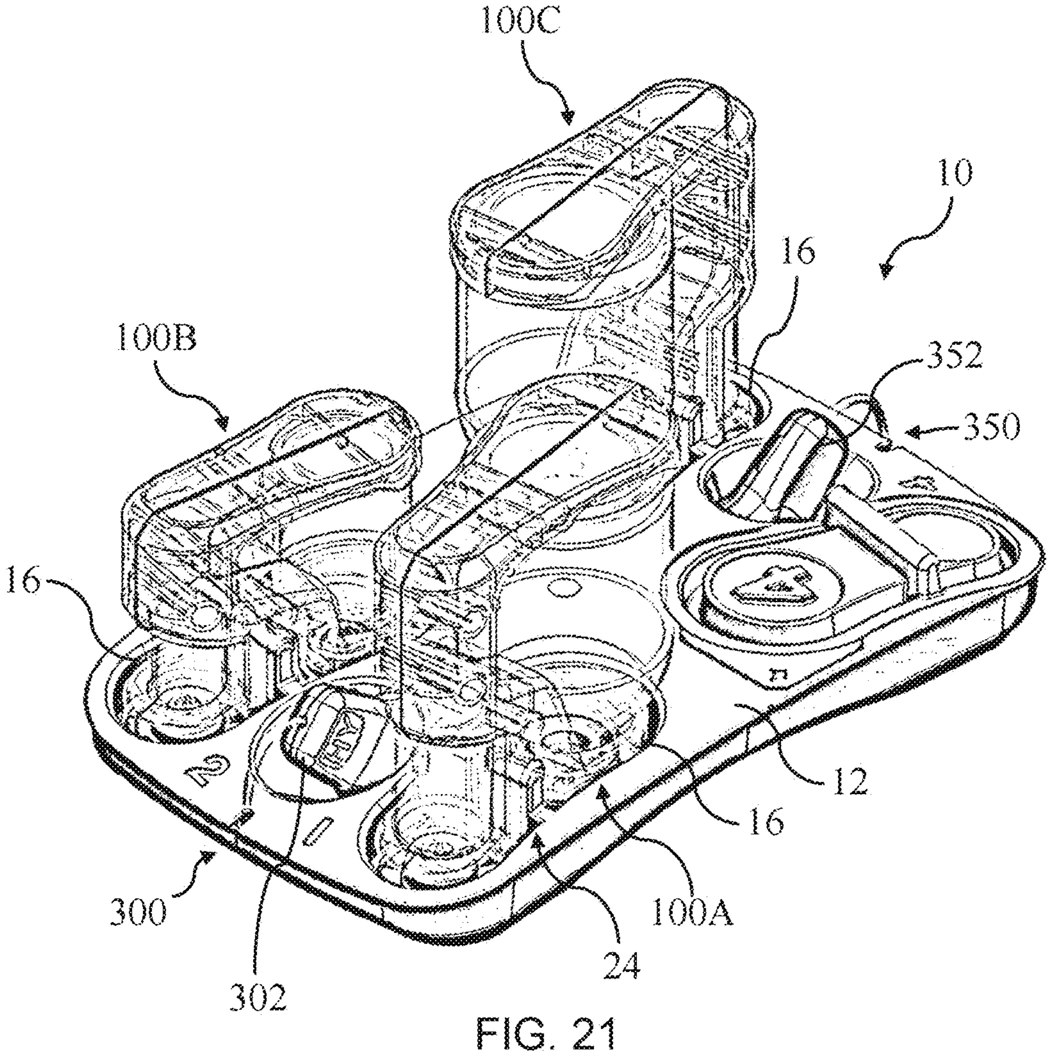
FIG. 21 depicts an embodiment of multiple container units in use with a pooling device.

FIG. 21 depicts an embodiment of multiple container units 100A, 100B, 100C in use with a pooling device 10. As shown in FIG. 21, each of the three container units is inverted and connected to a port 24 of the pooling device. Accordingly, the container units are secured and the containers disposed therein are fluidly connected to fluid distribution systems 300, 350 which terminate in fluidic interfaces 302, 352. The container units are supported by recesses 16 of the ports which have a shape complementary to the shape of an outer circumferential surface of the container units. In the embodiment of FIG. 21, the ports 24 are uniformly sized, and accept any container unit with a corresponding outer circumferential surface shape. That is, each of the container units shown have congruently shaped interface portions suitable to fit in the outer circumferential surface shape of the ports. Accordingly, even if the container units hold differing volumes of medicinal fluid, they may be connectable to the pooling device. As shown in FIG. 21, two container units 100A, 100C holding the same volume are shown in use with a container unit 100B having a smaller volume. The volumes of the medicinal fluids from each of the container units may be combined by the pooling device and supplied to the fluidic interfaces 302, 352 to reach a particular dosage. In the embodiment of FIG. 21, medicinal fluids from first containers of each of the container units are combined and supplied at one fluid interface and medicinal fluids from second containers of each of the container units are combined and suppled at another fluidic interface. Any suitable number of container units with any variations of medicinal fluid volume may be used alone in combination during an administration process. Additionally, any combination or mixing of medicinal fluids may be performed by the pooling device or other suitable medical device, the result of which may be supplied at one or more fluidic interfaces, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A container unit for storing medicinal fluid and interfacing with a pooling device, the container unit comprising:

a first container having a first internal volume and a first opening;

a second container having a second internal volume and a second opening; and a carrier configured to hold the first container and second container stationary relative to one another, wherein the carrier includes a slot that is disposed between the first container and the second container and is configured to receive an insert of a pooling device, wherein the slot has a shape configured to receive the insert, wherein the slot is configured to resist force applied to the carrier in at least one transverse direction when the slot has received the insert and wherein at least a first portion of the insert defines at least three walls of a rectangular prism.

2. The container unit of claim 1, wherein at least a second portion of the insert defines a horizontal cylindrical segment, wherein the second portion of the insert is positioned on a distal end of the insert.

3. The container unit of claim 1, wherein the slot includes at least one interior wall, wherein the insert includes a channel configured to receive the at least one interior wall, and wherein the at least one interior wall has a shape configured to be received by the channel.

4. The container unit of claim 1, wherein the carrier includes a first section and a second section configured to be secured together, where the first section and second section are configured to enclose the first container and the second container when the first section and the second section are secured together.

5. A plurality of container units for storing medicinal fluid and interfacing with a pooling device, the plurality of container units comprising:

a first container unit comprising:

a first container having a first internal volume and a first opening, a second container having a second internal volume and a second opening, and a first carrier configured to hold the first container and second container stationary relative to one another, wherein the first carrier includes a first interface portion disposed proximate the first opening and second opening; and a second container unit comprising:

a third container having a third internal volume and a third opening, a fourth container having a fourth internal volume and a fourth opening, and a second carrier configured to hold the third container and fourth container stationary relative to one another, wherein the second carrier includes a second interface portion disposed proximate the third opening and fourth opening, wherein a combined volume of the first internal volume and the second internal volume is different from a combined volume of the third internal volume and the fourth internal volume, and wherein the first interface portion and the second interface portion are congruent.

6. The plurality of container units of claim 5, wherein the first internal volume and the third internal volume are different.

7. The plurality of container units of claim 6, wherein the second internal volume and the fourth internal volume are different.

8. The plurality of container units of claim 6, wherein the second internal volume and the fourth internal volume are the same.

9. A plurality of container units for storing medicinal fluid and interfacing with a pooling device, the plurality of container units comprising:

a first container unit comprising:

a first container having a first internal volume and a first opening, a second container having a second internal volume and a second opening, and a first carrier configured to hold the first container and second container stationary relative to one another, wherein the first carrier includes a first interface portion disposed proximate the first opening and second opening; and a second container unit comprising:

a third container having a third internal volume and a third opening, a fourth container having a fourth internal volume and a fourth opening, and a second carrier configured to hold the third container and fourth container stationary relative to one another, wherein the second carrier includes a second interface portion disposed proximate the third opening and fourth opening, wherein the volume of the first internal volume is different from the volume of the third internal volume, and wherein the first interface portion and the second interface portion are congruent.

10. The plurality of container units of claim 9, wherein the second internal volume is different from the volume of the fourth internal volume.

11. The plurality of container units of claim 9, wherein the second internal volume is the same as the volume of the fourth internal volume.

12. A plurality of container units for storing medicinal fluid and interfacing with a pooling device, the plurality of container units comprising:

a first container unit comprising:

a first container having a first internal volume and a first opening, a second container having a second internal volume and a second opening, and a first carrier configured to hold the first container and second container stationary relative to one another, wherein the first carrier includes a first interface portion disposed proximate the first opening and second opening; and a second container unit comprising:

a third container having a third internal volume and a third opening, a fourth container having a fourth internal volume and a fourth opening, and a second carrier configured to hold the third container and fourth container stationary relative to one another, wherein the second carrier includes a second interface portion disposed proximate the third opening and fourth opening, wherein a combined volume of the first internal volume and the second internal volume is the same as a combined volume of the third internal volume and the fourth internal volume, and wherein the first interface portion and the second interface portion are congruent.

13. The plurality of container units of claim 12, wherein the second internal volume is different from the volume of the fourth internal volume.

14. The plurality of container units of claim 12, wherein the second internal volume is the same as the volume of the fourth internal volume.

15. A container unit for storing medicinal fluid and interfacing with a pooling device, the container unit comprising:

a first container having a first internal volume and a first opening;

a second container having a second internal volume and a second opening; and a carrier configured to hold the first container and second container stationary relative to one another, wherein the carrier includes a slot that is disposed between the first container and the second container and is configured to receive an insert of a pooling device, wherein the slot has a shape configured to receive the insert, wherein the slot is configured to resist force applied to the carrier in at least one transverse direction when the slot has received the insert, wherein the slot includes at least one interior wall, wherein the insert includes a channel configured to receive the at least one interior wall, and wherein the at least one interior wall has a shape configured to be received by the channel.

16. The container unit of claim 15, wherein at least a first portion of the insert defines at least three walls of a rectangular prism.

17. The container unit of claim 16, wherein at least a second portion of the insert defines a horizontal cylindrical segment, wherein the second portion of the insert is positioned on a distal end of the insert.

18. The container unit of claim 15, wherein the carrier includes a first section and a second section configured to be secured together, where the first section and second section are configured to enclose the first container and the second container when the first section and the second section are secured together.

* * * * *